(12) United States Patent
Hisada et al.

(10) Patent No.: US 7,467,872 B2
(45) Date of Patent: Dec. 23, 2008

(54) PROJECTION OPTICAL UNIT AND PROJECTION TYPE VIDEO DISPLAY DEVICE USING THE UNIT

(75) Inventors: Takanori Hisada, Yokohama (JP); Hiroki Yoshikawa, Hiratsuka (JP); Tetsu Ohishi, Hiratsuka (JP); Masahiko Yatsu, Fujisawa (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 11/258,384

(22) Filed: Oct. 26, 2005

(65) Prior Publication Data
US 2006/0227299 A1    Oct. 12, 2006

(30) Foreign Application Priority Data
Apr. 8, 2005    (JP)    ............................ 2005-111517

(51) Int. Cl.
  *G03B 21/22*    (2006.01)
(52) U.S. Cl. .......................... 353/77; 353/78
(58) Field of Classification Search ............ 353/77, 353/78, 98, 99, 37; 359/726–731, 850, 857–861
See application file for complete search history.

(56) References Cited

U.S. PATENT DOCUMENTS

| 5,274,406 | A | * | 12/1993 | Tejima et al. ................. 353/70 |
| 2004/0141157 | A1 | * | 7/2004 | Ramachandran et al. ...... 353/70 |
| 2004/0156117 | A1 | | 8/2004 | Takaura et al. |
| 2004/0174611 | A1 | | 9/2004 | Hatakeyama |
| 2004/0196568 | A1 | | 10/2004 | Matsuo |
| 2005/0200974 | A1 | * | 9/2005 | Nishikawa et al. .......... 359/691 |
| 2006/0056037 | A1 | | 3/2006 | Kuwa |
| 2006/0176579 | A1 | | 8/2006 | Kuwa |
| 2006/0227299 | A1 | | 10/2006 | Hisada et al. |
| 2008/0130106 | A1 | * | 6/2008 | Gohman ..................... 359/434 |

FOREIGN PATENT DOCUMENTS

| JP | 5-134213 | 5/1993 |
| JP | 2000-162544 | 6/2000 |
| JP | 2001-264627 | 9/2001 |
| JP | 2002-350774 | 12/2002 |
| JP | 2002-357768 | 12/2002 |
| WO | WO 2004/111699 A1 | 12/2004 |

OTHER PUBLICATIONS

Chinese Office Action with English Translation, issued in Chinese Patent Application No. CN 200510127941.2, dated on Mar. 30, 2007.
U.S. Appl. No. 11/280,821, filed Nov. 17, 2005.
Jan. 14, 2008 Office Action from U.S. Appl. No. 11/280,821.

* cited by examiner

*Primary Examiner*—Hung Henry Nguyen
(74) *Attorney, Agent, or Firm*—McDermott Will & Emery LLP

(57) ABSTRACT

In the image display device, a projection lens including a plurality of lenses for enlarging an image from an image display element is constituted of a front group and a rear group. The rear group includes at least one free-shaped-surface lens including a surface having a rotationally asymmetrical shape. Furthermore, the device includes at least one free-shaped-surface mirror having a rotationally asymmetrical reflection surface. Accordingly, a set can be formed to be compact while correcting trapezoidal distortion and aberration.

9 Claims, 16 Drawing Sheets

PROJECTION OPTICAL UNIT AND PROJECTION TYPE VIDEO DISPLAY DEVICE USING THE UNIT

INCORPORATION BY REFERENCE

The present application claims priority from Japanese application JP2005-111517 filed on Apr. 8, 2005, the content of which is hereby incorporated by reference into this application.

BACKGROUND OF THE INVENTION

1. Field of the Invention

The present invention relates to a projection type video display device which projects an enlarged image on a screen to display an image, and a projection optical unit.

2. Description of the Related Art

In a color video display device which enlarges and projects an image of a video display element on a screen by means of a projection optical unit, it is demanded that a depth of the device be reduced while obtaining an enlarged video having a sufficient size on the screen. To realize this, as described in, for example, JP-A-5-134213 (Patent Document 1), JP-A-2000-162544 (Patent Document 2), and JP-A-2002-357768 (Patent Document 3), there is known a projection optical unit having such a constitution as to enlarge and project the image on the screen from an oblique direction.

SUMMARY OF THE INVENTION

When an image is projected on a screen from an oblique direction, a so-called trapezoidal distortion is generated in a projected image. To solve this problem, in the projection optical unit described in Patent Document 1, an afocal converter disposed on a screen side is displaced eccentrically to reduce the trapezoidal distortion. Since the afocal converter disclosed in Patent Document 1 has a small magnification, it is difficult to enlarge a field angle, and thinning of the device cannot be achieved.

Even in the projection optical unit described in Patent Document 2, it is difficult to enlarge the field angle to such an extent that a rear projection type color video display device can be sufficiently thinned. There is also a problem that it is difficult to manufacture the unit because lenses for use need to be individually eccentric.

Furthermore, the projection optical unit described in Patent Document 3 has a first refraction lens system of a positive power, a second refraction lens system of a negative power, and an optical path turnup mirror, and at least two lenses of the second refraction lens system having the negative power constitute an eccentric system having different rotationally symmetrical properties. Therefore, there is a problem that it is difficult to secure a positional precision of each lens at a manufacturing time, and it is difficult to manufacture the unit.

In a so-called oblique projection for enlarging and projecting the image on the screen from the oblique screen, an angle of the oblique projection needs to be enlarged more in order to reduce a depth of the projection optical unit. However, when the angle of the oblique projection is enlarged more, the trapezoidal distortion enlarges more. Since an eccentricity for correcting the trapezoidal distortion needs to be enlarged more, it becomes more difficult to manufacture the unit. Accordingly, since a lens diameter becomes larger, it is difficult to reduce the depth of the conventional optical system more.

Moreover, in the rear projection type display device, not only the depth but also a height of a lower part of the screen are required to be reduced more in order to obtain a compacter outer shape.

The present invention has been developed in view of such problems, and there is provided a preferable technology for constituting a rear projection type display device to be compact.

In the present invention, in a case where a so-called oblique projection is performed to enlarge and project an image at a predetermined angle with respect to a normal to a main plane of a screen, at least one asymmetric lens (e.g., a lens having a free shaped surface, hereinafter referred to as the free-shaped-surface lens) having a rotationally asymmetrical shape is used in a projection lens for use in enlarging the image. This free-shaped-surface lens is dented in an emission direction of light, and a curvature of a portion which passes light entering a lower end of the screen passes may be set to be larger than that of a portion which passes light entering an upper end of the screen.

Moreover, the present invention has a further characteristic that a projection lens including the free-shaped-surface lens is combined for use with a rotationally asymmetrical convex reflection mirror (e.g., a mirror having a free shaped surface, hereinafter referred to as the free-shaped-surface mirror) whose reflection surface has a convex shape in a reflection direction. In this free-shaped-surface mirror, a curvature of a portion which reflects light entering the lower end of the screen may be set to be larger than that of a portion which reflects light entering an upper end of the screen. In the free-shaped-surface mirror, the portion which reflects the light entering the lower end of the screen may have the convex shape in the reflection direction, and the portion which reflects the light entering the upper end of the screen may have a concave shape in the reflection direction.

As described above, according to the present invention, it is possible to realize a compact device whose optical depth is small and in which a height of a lower part of a screen is small.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will be described hereinafter with reference to the drawings.

Figure 1:
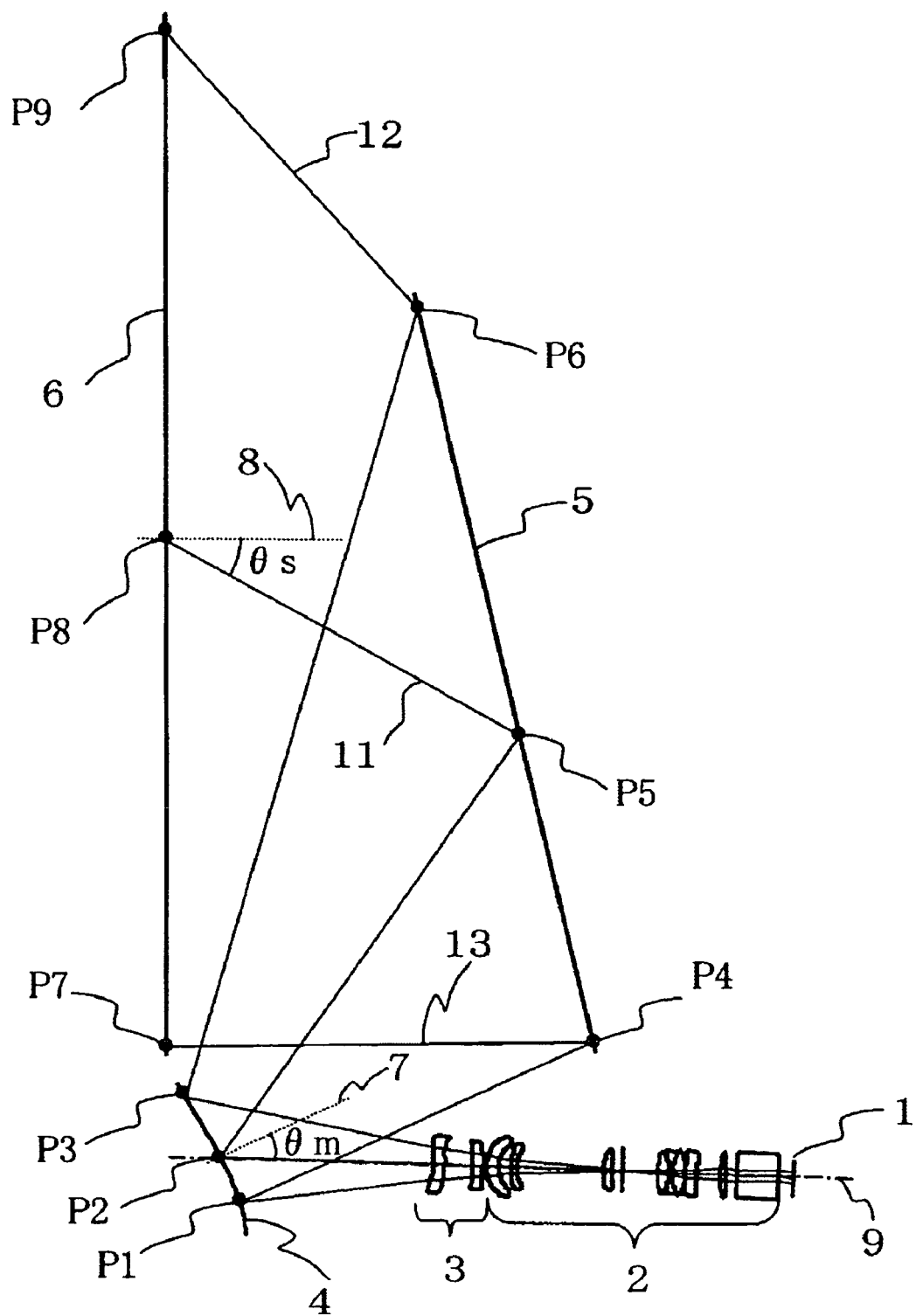
FIG. 1 is a sectional view showing a basic constitution of a projection optical unit according to the present invention.

FIG. 1 is a sectional view showing a basic optical constitution of a rear projection type projection device using a projection optical unit according to the present invention. FIG. 1 shows a constitution of an optical system in a YZ section in an XYZ orthogonal coordinate system. Here, it is assumed that an origin of the XYZ orthogonal coordinate system is a center of a display screen of an image display element 1, a Z-axis is parallel to a normal of a screen 6, a Y-axis is parallel to a short side of the screen, that is, has a screen vertical direction, and an X-axis is parallel to a long side of the screen, that is, has a screen horizontal direction.

As shown in FIG. 1, light emitted from the image display element 1 enters a first optical system constituted of a plurality of lenses. The first optical system includes a front group 2 and a rear group 3. The light from the image display element 1 first passes through the front group 2 including a plurality of refraction lenses having rotationally symmetrical surface shapes. Thereafter, the light passes through the rear group 3 including two lenses having shapes of free shaped surfaces, at least one of which is not rotationally symmetrical (is rotationally asymmetrical). Moreover, after the light is reflected by a second optical system including at least one reflection mirror (hereinafter referred to as the free-shaped-surface mirror) 4 having a free-shaped reflection surface that is not rotationally symmetrical, the light is reflected by a rear-surface mirror 5 having a flat reflection surface, and enters the screen 6.

Here, the image display element 1 may be of a self-emitting type, or a transmission type such as a liquid crystal panel. Since a lamp or the like required for irradiating the liquid crystal panel in the transmission type is not directly related to a characteristic of the present embodiment, it is omitted from the drawing. The image display element 1 may be of such a type of combining a plurality of pictures, such as a so-called three-plate type. In this case, a prism or the like for combining images is required, but it is also omitted from the drawing.

According to the present embodiment, as shown in FIG. 1, in the image display element 1, a center of a display screen is disposed on an optical axis of the first optical system. Therefore, after exiting from the center of the display screen of the image display element 1 and traveling through the center of an incidence pupil of the first optical system toward the screen center on the screen 6, a ray 11 (hereinafter referred to as the screen center ray) substantially travels along an optical axis of the first optical system. After this screen center ray is reflected by a point P2 on the free-shaped reflection surface 4 of the second optical system, the ray is reflected by a point P5 on the rear mirror 5, and enters a point P8 in the center of the screen 6 from under the screen 6 obliquely with respect to a normal 8 of the screen. This angle will be referred to as "oblique incidence angle", and represented by θs. That is, this means that the ray transmitted along the optical axis of the first optical system obliquely enters the screen, and the optical axis of the first optical system is substantially obliquely disposed with respect to the screen. When the ray obliquely enters the screen by such method, a so-called trapezoidal distortion occurs, that is, a projected rectangular shape turns to a trapezoidal shape. In addition, there occur various aberrations which are not rotationally symmetrical with respect to the optical axis, and they are corrected by means of a rear group of the first optical system, and the reflection surface of the second optical system.

Figure 2:
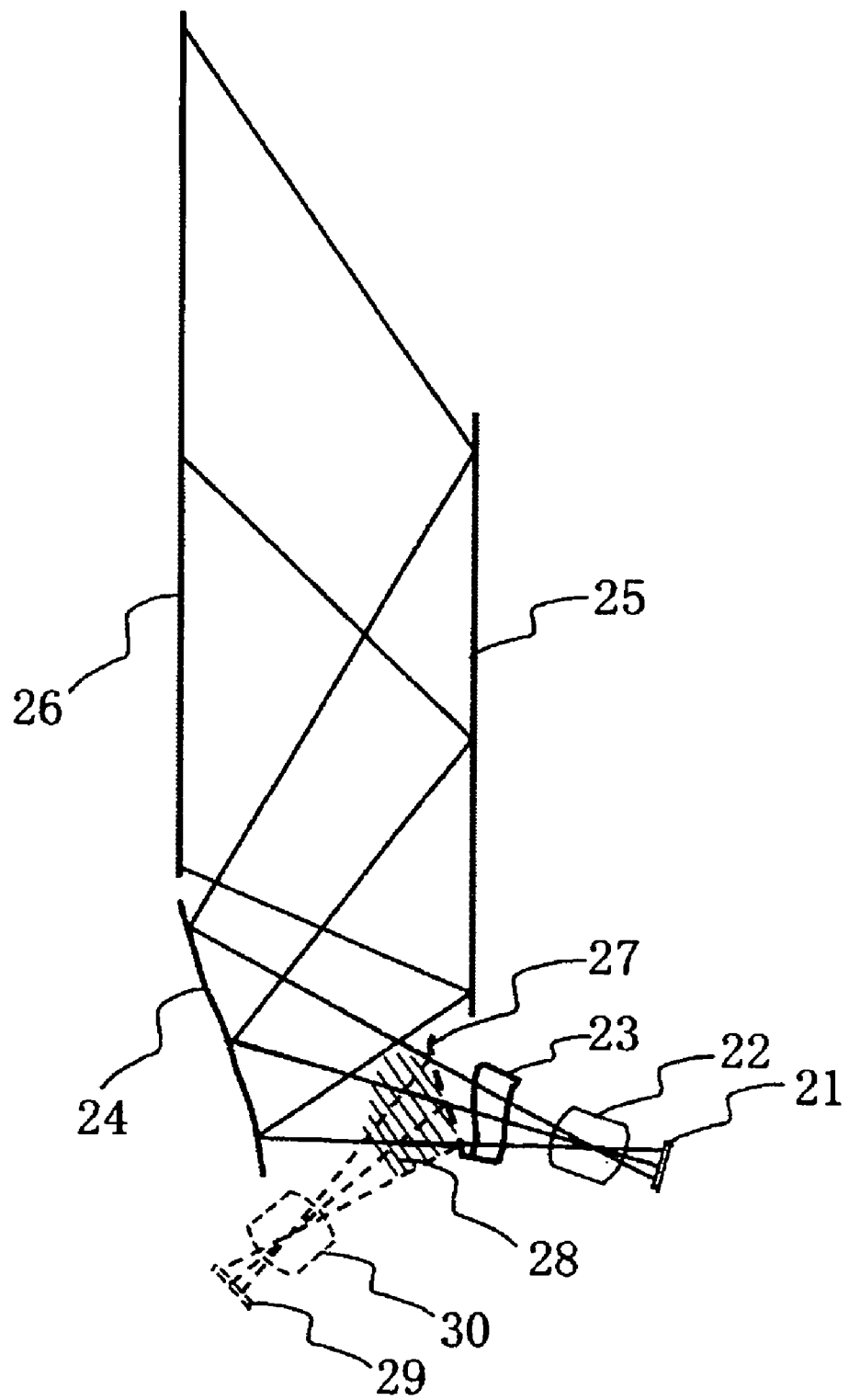
FIG. 2 is a schematic diagram showing an effect of a transmission type lens.

Instead of the free-shaped-surface lenses of the rear group of the first optical system, the reflection surface having the free shaped surface may be disposed as means for realizing such oblique projection to correct the aberration. FIG. 2 shows an example in which the reflection surface is used instead of such free-shaped-surface lens and an example in which the free-shaped-surface lens is used without using any reflection surface. FIG. 2 first shows an entire constitution by a solid line based on the constitution of the present embodiment. That is, the ray exits from an image display element 21, passes through a front group 22 of a first optical system, passes through a rear group 23 including transmission type free-shaped-surface lenses in the first optical system, and is reflected by a second optical system 24 having a free-shaped-surface reflection surface before the ray enters a screen 26 via a rear mirror 25. Here, FIG. 2 shows a constitution by broken lines in a case where a second reflection surface 27 that is not rotationally symmetrical and that has a free shaped surface is used instead of the lenses of the rear group 23 of the first optical system. In a case where the second reflection surface 27 is used as shown by the broken lines, an optical element such as a lens cannot be disposed in a region 28 where the ray entering the reflection surface overlaps with the reflected ray, and an entire ray becomes bulky. The ray extends long in a lower direction from the screen, and it is especially difficult to realize a compact optical system in which a height of the lower part of the screen is reduced.

On the other hand, in a case where the free-shaped-surface lens 23 having the free shaped surface that is rotationally asymmetrical is used instead of the second reflection surface 27, it is possible to reduce an interval between the lens 23 and the front group 22 of the first optical system, and the system becomes entirely compact. This produces an effect that the height of the lower part of the screen can be reduced. When the transmission lens having the free shaped surface is combined with the reflection surface having the free shaped surface in this manner, it is possible to realize the compact optical system in which the depth and the height of the lower part of the screen are reduced. This free-shaped-surface lens directs its concave portion in an emission direction of the light, and a curvature of a portion through which the ray entering a lower end of the screen passes may be set to be larger than that of a portion through which the ray entering an upper end of the screen passes.

Here, the free-shaped-surface lens 23 is curved while turning its concave portion in the emission direction of the light, and has such a shape that the curvature of the portion through which the ray entering the lower end of the screen passes is larger than that of the portion through which the ray entering the upper end of the screen passes.

In this case, in a case where the free-shaped-surface lens 23 is used, it seems that a position of the image display element 21 is distant from a direction of the normal of the screen, and the depth enlarges. This depth can be reduced by use of a folded mirror. That is, the folded mirror is disposed between the free-shaped-surface mirror 24 and the rear group 23 of the first optical system, between the front group 22 and the rear group 23 of the first optical system, or midway in the front group 22. Moreover, the optical axis of the first optical system is bent in a direction substantially vertical to a section shown in FIG. 2. This can prevent the depth from being increased.

Moreover, the present embodiment is constituted in such a manner as to satisfy the following conditions. In the section shown in FIG. 1, it is assumed that a ray 12 is emitted from a screen lower end of the image display element 1 to pass through the center of the incidence pupil of the first optical system 2, and enters a point P9 in a screen upper end of the screen 6. It is assumed that an optical path length of the ray traveling from a point P3 to the point P9 via a point P6 is L1. The ray 12 passes through the free-shaped-surface mirror 4 in the point P3, and reaches the point P9 on the screen via the point P6 on the rear mirror. It is also assumed that a ray 13 is emitted from a screen upper end of the image display element 1 to pass through the center of the incidence pupil of the first optical system 2, and enters a point P7 in a screen lower end of the screen 6. It is assumed that an optical path length of the ray traveling from a point P1 to the point P7 via a point P4 is L2. The ray 13 passes through the free-shaped-surface mirror 4 in the point P1, and reaches the point P7 on the screen via the point P4 on the rear mirror. The present projection optical unit is constituted in such a manner that the lengths L1 and L2 satisfy the following expressions:

$$|L1-L2|<1.2*\sin\theta s*Dv, \quad \text{(Expression 1)}$$

wherein Dv denotes a size of a screen upper screen in the section of FIG. 1, and, in other words, corresponds to a distance from the point P9 of the screen upper end on the screen to the point P7 of the screen lower end, and θs denotes the oblique incidence angle.

Figure 3:
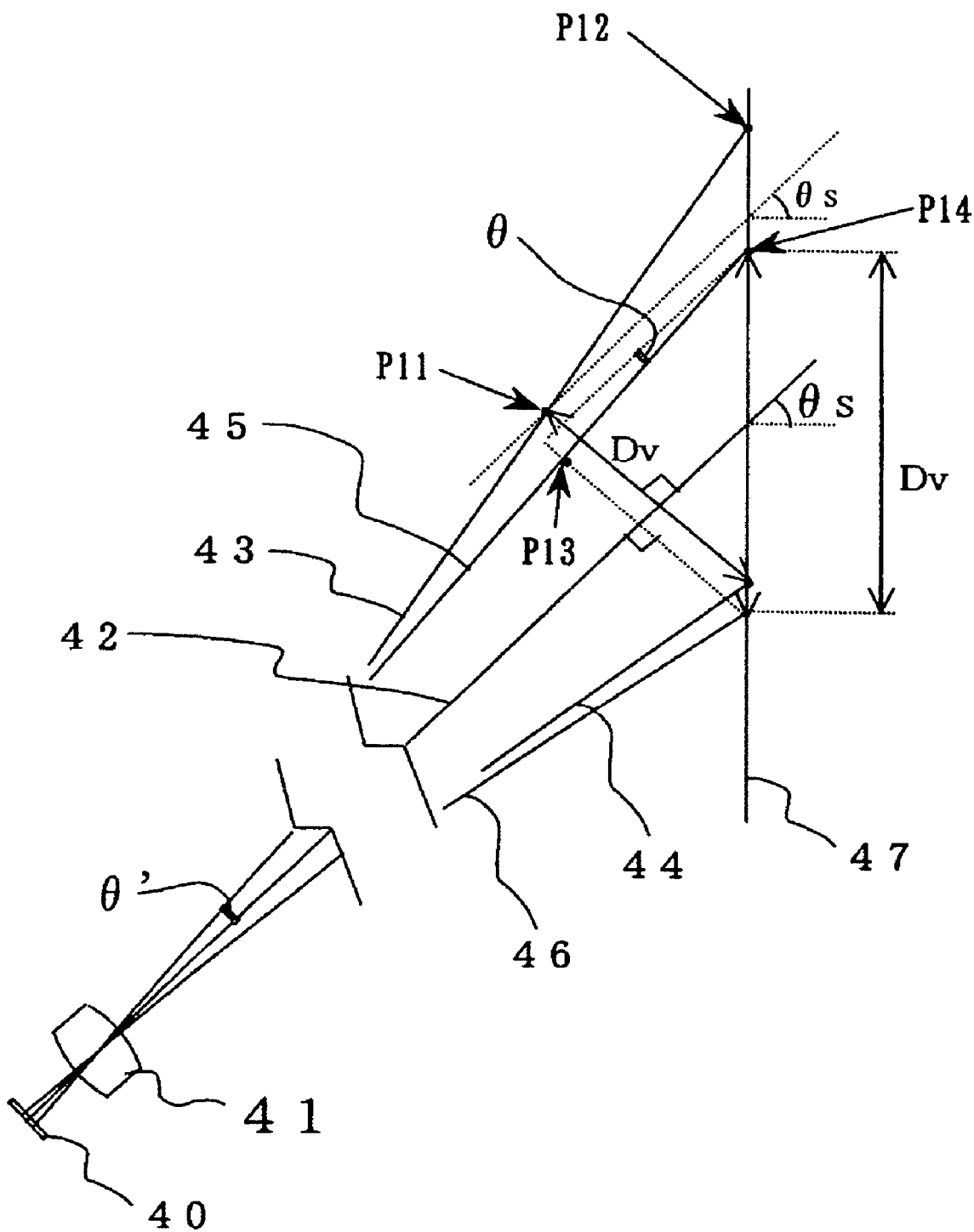
FIG. 3 is a schematic diagram showing an oblique projection onto a screen.

Here, reasons for the above-described conditions will be described. FIG. 3 shows a conceptual diagram in a case where a projection lens of a coaxial optical system is inclined with respect to the screen, and the ray obliquely enters the lens. With reference to FIG. 3, there will be considered a case where a ray 42 is emitted along the optical axis from the screen center of an image display element 40 disposed on the optical axis of a projection optical system 41, and reaches a screen 47. In this case, a size of the screen in a direction vertical to the ray 42 in the vicinity of the screen is a distance between an intersection of a line vertical to the ray 42 and an upper ray 43, and an intersection of the line and a lower ray 44. This corresponds to an original size Dv of the screen. However, the upper ray 43 of the drawing reaches a point P12 on the screen owing to oblique incidence, a size of the screen becomes larger than Dv, and a figure in the screen is distorted. In this case, there is made a difference of the optical path length from the projection lens and the screen between the upper ray 43 and the lower ray 44 in the drawing. A magnitude of the difference of the optical path length approximately corresponds to a distance between an intersection P11 of the line vertical to the ray 42 in the center of the drawing and the upper ray 43, and the intersection P12 of the ray 43 and the screen 47.

Here, assuming that an optical element using the free shaped surface is disposed just outside the projection lens 41 and the figure distortion is corrected, for example, a screen upper side moves from the point P12 to a point P14, the lower point also similarly moves, and the size of the screen returns to the original size Dv. In this case, a difference of the optical path length between a ray 45 on the screen upper side and a ray 46 on the screen lower side approximately corresponds to a distance between a point P13 and the point P14, and the difference is reduced as compared with a magnitude before the figure distortion is corrected. That is, it can be confirmed that the figure distortion can be eliminated, when the difference between the optical path lengths is reduced in such a manner as to correspond to the distance between the points P13 and P14. A magnitude (hereinafter denoted with Lx) of the distance between the points P13 and P14 is approximately represented by the following equation:

$$Lx=Dv*(\sin\theta s)/(\cos\theta'), \quad \text{(Expression 2)}$$

wherein θ' denotes a half field angle in the section of FIG. 2 after emission from the free-shaped-surface mirror. When this angle is set to about 30 degrees, the upper equation approximately turns to the following equation.

$$Lx=1.2*(\sin\theta)*Dv. \quad \text{(Expression 3)}$$

The above-described approximation includes a conditions that the free-shaped-surface mirror is sufficiently distant, but it is considered that the difference between the optical path lengths is reduced more in a case where the free-shaped-surface mirror is close to the screen. Therefore, the difference between the optical path lengths is represented by Expression 1 on a condition that the difference is smaller than the value represented by the above equation.

The above description is related to the interval between the free-shaped-surface mirror and the screen. However, even when the free shaped surface whose aberration is to be corrected is a refracted surface only, needless to say, the above-described conditions are established with respect to the optical path length between the free shaped surface closest to the screen in the path and the screen.

Consequently, while the display screen of the image display element 1 is disposed in the vicinity of the first optical system in the optical axis, the trapezoidal distortion due to the oblique incidence can be eliminated without causing enlargement of a lens diameter in the first optical system. Furthermore, it is possible to realize the projection optical unit in which an optical depth of a set is reduced and which is easily manufactured.

On the other hand, the center of the display screen of the image display element 1 is disposed on the optical axis of the first optical system, but the normal of the display screen is preferably inclined from the optical axis of the first optical system. Referring to FIG. 1, as described above, the optical path length extending from the point P3 to the point P9 via the point P6 is longer than that extending from the point P1 to the point P7 via the point P4. This means that the image point P9 on the screen is farther than the image point P7 as viewed from the first optical system. Inclination of an image plane can be corrected, when an object point (point on the display screen) corresponding to the image point P9 on the screen is closer to the first optical system, or an object point corresponding to the image point P7 is farther from the first optical system. To realize the correction, a normal vector of the display screen center of the image display element 1 is inclined with respect to the optical axis of the first optical system in a plane including the normal of the screen 6 and a picture plane center ray. Moreover, a direction of the inclination may be regarded as a direction in which the screen 6 is positioned.

There is known a method in which an object plane is inclined in order to obtain an image plane inclined with respect to the optical axis, but deformation asymmetrical with respect to the optical axis occurs in the image plane due to the inclination of the object plane at a field angle having a practical size, and it is difficult to correct the deformation with the rotationally symmetrical projection lens. In the present embodiment, since the rotationally asymmetrical free-shaped-surface lens is used, it is possible to cope with the deformation of the asymmetrical image plane. Therefore, when the object plane is inclined, that is, the display surface of the image display element is inclined, a low-order image plane distortion can be largely reduced, and aberration correction by the free shaped surface is effectively assisted.

Moreover, there will be preferably set as follows the optical path length of the picture plane center light 11 reflected by the point P2 on the reflection surface of the second optical system and traveling to the point P8 of the picture plane center of the screen via the point P5 of the plane reflection mirror 5. That is, when this optical path length is in a range of 0.8 to 1.2 times the distance from the upper end to the lower end of the picture plane of the screen 6 in the section of FIG. 1, the trapezoidal distortion in the object incidence upon the screen is satisfactorily eliminated.

In the present embodiment, based on such conditions, the following conditions have been found to reduce the height of the lower part of the screen more in addition to the above-described method. That is, in FIG. 1, the distance between the point P8 of the picture plane center in the screen 6 and the point P2 on the reflection surface of the second optical system is about 1.3 times ½ of the distance between the upper end and the lower end of the picture plane. If the optical path length from the point P2 via the point P5 to the point P8 is in a range based on the above-described conditions, the distance between the points P8 and P2 becomes about 1.5-fold. In this case, the ray which enters the point P5 from the point P2 forms an angle of about 90 degrees together with the ray reflected by the point P5 and directed to the point P8. Assuming that the ray entering the point P2 and the ray traveling to the point P8 form an angle of about 90 degrees in the point P5, an optical axis 9 of the first optical system forms the following angle α with the screen normal 8 in a case where the optical axis is inclined with respect to the normal 8 of the screen in a clockwise direction:

$$\alpha = \theta s + 2 \ast \theta m - 90. \quad \text{(Expression 4)}$$

In a case where the optical axis 9 of the first optical system is largely inclined downwards with respect to the normal of the screen, the lower end of the first optical system comes below the lower end of the free-shaped-surface mirror 4, and therefore the lower part of the screen is raised. When the optical axis of the first optical system substantially becomes parallel to the normal of the screen, the lower end of the first optical system comes above that of the reflection surface of the second optical system, and the height of the lower part of the screen can be minimized. To bring the lower end of the first optical system above that of the free-shaped-surface mirror in this manner, a value of α described above may be set to be smaller than about five degrees, and the following expression may be set:

$$(\theta s + 2 \ast \theta m) < 95. \quad \text{(Expression 5)}$$

Next, as to a function of each optical element, the front group 2 of the first optical system includes a main lens for projecting the display picture plane of the image display element 1 onto the screen, and a basic aberration in the rotationally symmetrical optical system is corrected. The rear group 3 of the first optical system includes a free-shaped-surface lens which is not rotationally symmetrical, and the second optical system includes the free shaped reflection surface which is not rotationally symmetrical. Therefore, the aberration generated by the oblique incidence is mainly corrected. That is, the second optical system mainly corrects the trapezoidal distortion, and the rear group of the first optical system mainly corrects an asymmetrical aberration such as the distortion of the image plane.

In the embodiment of the present invention, the second optical system includes one reflection surface having the free shaped surface which is not rotationally symmetrical, and the rear group of the first optical system includes two transmission type lenses. Each of the lenses have opposite free shaped surfaces which are not rotationally symmetrical. Here, the free-shaped-surface mirror is curved in such a manner as to direct its convex portion in the reflection direction. Moreover, the curvature of the portion of the free-shaped-surface mirror which reflects the ray entering the lower end of the screen is set to be larger than that of the portion which reflects the ray entering the upper end of the screen. The portion which reflects the ray entering the lower end of the screen may form a convex shape in the reflection direction, and the portion which reflects the ray entering the upper end of the screen may form a concave shape in the reflection direction.

A distance in an optical axis direction between a coordinate origin of the reflection surface of the second optical system and the lens surface closest to the reflection surface of the second optical system in the front group is preferably set to be five or more times a focal distance of the front group. A trapezoidal distortion aberration is effectively corrected by means of the reflection surface of the second optical system having the free shaped surface, and a satisfactory performance can be obtained.

On the other hand, it becomes very difficult to manufacture the free-shaped-surface mirror, when the dimension increases. Therefore, it is important to set the mirror to a size which is not more than a predetermined size. For example, since the size of the rear mirror 5 shown in FIG. 1 is about 70% or more of the screen picture plane, a rear projector having a large picture plane such as 50 or more model has a size exceeding 500 mm. If this plane is formed into the free shaped surface, it becomes very difficult to manufacture the mirror. Therefore, it is not appropriate to form the rear mirror into the free shaped surface in the rear projector. Therefore, in the present embodiment, as shown in FIG. 1, the dimension of the free-shaped-surface mirror 5 is set to be smaller than that of the flat reflection mirror 3, and the free-shaped-surface mirror 5 is disposed below the flat reflection mirror 3. Moreover, image light from the projection lens 2 is reflected in order by the free-shaped-surface mirror 5 and the flat reflection mirror, and projected on the screen 3. The above description is based on the embodiment shown in FIG. 1. However, even when the folding direction of the optical path by the mirror exists in the plane including a picture plane long side in reverse to FIG. 1, a concept similar to that of the above-described embodiment can be applied.

Therefore, the trapezoidal distortion due to the oblique incidence can be eliminated without increasing eccentricity of the lens or the lens diameter or without increasing the number of the lenses in the projection lens 2 having the refraction surface. Furthermore, it is possible to realize the projection optical unit whose depth is reduced and which is easily manufactured. In addition, according to the present embodiment, there can be provided a compact set in which the depth and the height of the screen lower part are reduced, and there can be provided an optical system which is a small free-shaped-surface mirror and which is easily manufactured.

Typical numerical value examples of the present invention will be described hereinafter.

EXAMPLE 1

Figure 4:
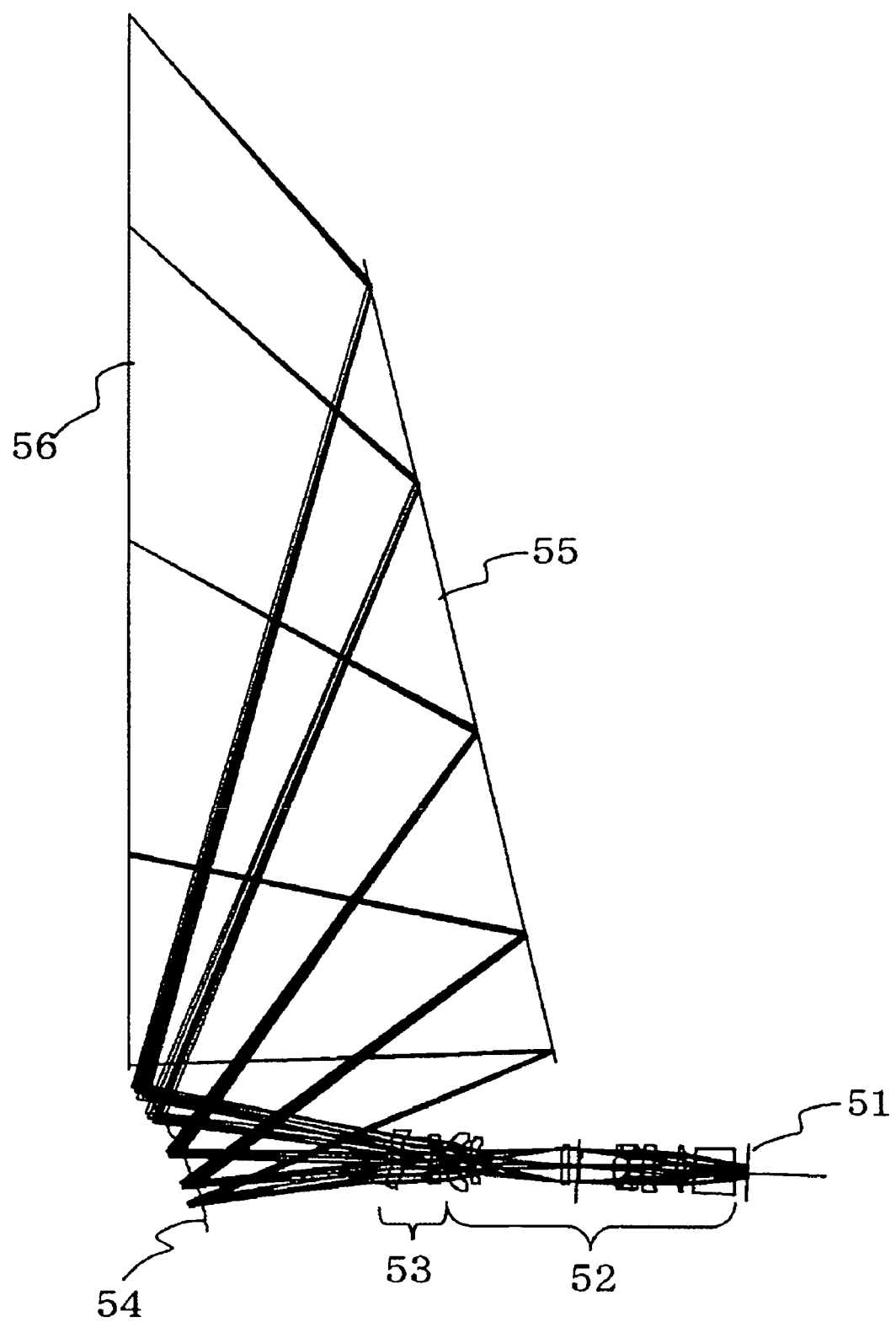
FIG. 4 is a YZ sectional view showing a constitution and an optical path in Embodiment 1 according to the present invention.
Figure 5:
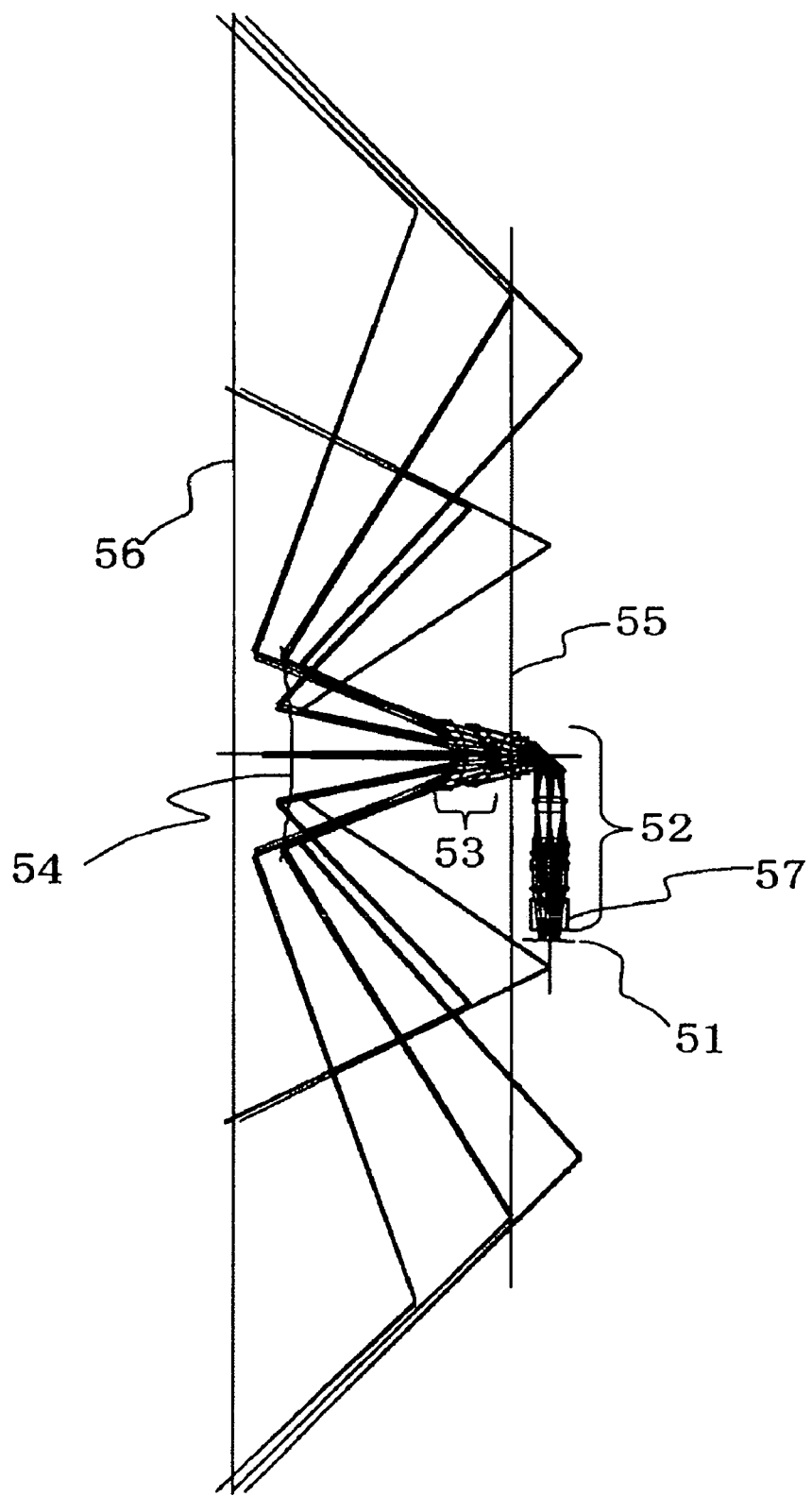
FIG. 5 is an XZ sectional view showing a constitution and an optical path in Embodiment 1 according to the present invention.

One typical example of the present embodiment using typical numerical values will be described with reference to FIGS. 4 to 7 and Tables 1 to 4. FIGS. 4 and 5 show ray diagrams of an optical system according to the present invention based on a first numerical value example, In the above-described XYZ orthogonal coordinate system, FIG. 4 shows a structure in a YZ section, and FIG. 5 shows that in an XZ section. FIG. 1 shows an example in which a folding mirror is disposed midway in a front group 12 of a projection lens 2, and an optical path is once bent in an X-axis direction. FIG. 4 omits this folding mirror, and shows an optical system developed in a Z-axis direction. FIG. 5 shows an optical system including the folding mirror to bend the optical path. A position or angle for disposing the folding mirror is somewhat arbitrary, and a function of each optical element is not influenced. Therefore, in the following description, the folding mirror is omitted.

In the present example, light emitted from an image display element 51 displayed on a lower side of FIG. 4 first passes through a front group 52 including only lenses having only rotationally symmetrical surfaces among a plurality of projection lenses 2. Moreover, the light passes through a rear group 53 including rotationally asymmetrical free-shaped-surface lenses, and is reflected by a reflection surface of a free-shaped-surface mirror 54 which is a second optical system. The reflected light is reflected by a flat reflection mirror 55, and enters a screen 56.

Here, the front group 52 of the projection lenses 2 includes a plurality of lenses having refraction surfaces which are all rotationally symmetrical, four of the respective refraction surfaces are rotationally symmetrical non-spherical surfaces, and the other surfaces are spherical. The rotationally symmetrical non-spherical surface used herein is represented by the following equation by use of a local cylindrical coordinate system for each plane:

$$Z = \frac{cr^2}{1+\sqrt{1-(1+k)c^2r^2}} + A \cdot r^4 + B \cdot r^6 + C \cdot r^8 + \quad \text{(Expression 6)}$$

$$D \cdot r^{10} + E \cdot r^{12} + F \cdot r^{14} + G \cdot r^{16} + H \cdot r^{18} + J \cdot r^{20}$$

wherein r denotes a distance from the optical axis, Z denotes a sag amount, c denotes a curvature of a vertex, k denotes a conical constant, and A to J are coefficients of a power term of r.

Free shaped surfaces constituting the rear group 53 of the first optical system are represented by the following equation including a polynomial of X and Y by use of a local orthogonal coordinate system (x, y, z) in which a plane vertex of each plane is an origin:

$$Z = \frac{cr^2}{1+\sqrt{1-(1+k)c^2r^2}} + \sum_m \cdot \sum_n (C(m,n) \cdot x^m \cdot y^n) \quad \text{(Expression 7)}$$

wherein Z denotes the sag amount of the free shaped surface in a direction vertical to X, Y-axes, c denotes a curvature of the vertex, r denotes a distance from the origin in the plane of X or Y axis, k denotes the conical constant, and C(m, n) is a coefficient of the polynomial.

Table 1 shows numerical value data of the optical system according to the present embodiment. In Table 1, symbols S0 to S23 correspond to S0 to S23 shown in FIG. 10. Here, S0 denotes a display surface, that is, an object surface of the image display element 1, and S23 denotes the reflection surface of the free-shaped-surface mirror 5. Although not shown in FIG. 10, S24 denotes an incidence surface, that is, an image surface of the screen 3. It is to be noted that in FIG. 10, an upper drawing shows a sectional view in a vertical direction of the first and second optical systems, and a lower drawing shows a horizontal-direction sectional view of the optical system.

In Table 1, Rd denotes a curvature radius of each surface, indicates a positive value in a case where there is a center of the curvature on the left side of the surface in FIG. 4, and indicates a negative value in a reverse case.

In Table 1, TH denotes a distance between surfaces, and indicates a distance between a vertex of a lens surface and that of the next lens surface. As to the associated lens surface, the distance between the surfaces indicates the positive value in a case where the next lens surface is on the left side in FIG. 4, and indicates the negative value in a case where the surface is on the right side.

In Table 1, S5, S6, S17, and S18 denote rotationally symmetrical non-spherical surfaces, and * are attached to the surface numbers in Table 1 in such a manner that they are easily seen. The coefficients of these four non-spherical surfaces are shown in Table 2. In Table 1, S19 to S22 are refraction surfaces having free shaped surfaces constituting the rear group of the first optical system, and S23 provided with # attached to the surface number denotes the reflection surface having the free shaped surface in the second optical system. The values of the coefficients indicating these five free shaped surfaces are shown in Table 3.

In the present example, the object plane which is the display picture plane of the image display element 51 is inclined by −1.163 degrees with respect to the optical axis of the first optical system. As to a direction of inclination, a direction in which the normal of the object plane rotates counterclockwise in the section of FIG. 4 is indicated in a positive value. Therefore, in the present example, the object plane is inclined by 1.163 degrees in a clockwise direction from a position vertical to the optical axis of the first optical system in the section of FIG. 4.

As to the free-shaped-surface mirror 54 of S23, the origin of the local coordinate is disposed on the optical axis of the first optical system, and the normal, that is, the Z-axis in the origin of the local coordinate is inclined by 29 degrees from a position parallel to the optical axis of the first optical system. As to the inclination direction, a direction in which the mirror rotates counterclockwise in the section of FIG. 4 is judged to be positive in the same manner as in the object plane. Therefore, the mirror is inclined counterclockwise. Therefore, the picture plane center ray exiting from the picture plane center of the image display element 51 and traveling substantially along the optical axis of the first optical system is reflected by S23, and travels in a direction inclined by 58 degrees which are twice the inclination angle with respect to the optical axis of the first optical system. Therefore, a direction passing through the coordinate origin of S23 and inclined by twice the inclination angle of the surface S23 with respect to the optical axis of the first optical system is regarded as a new optical axis after the reflection, and the subsequent surface is assumed to be disposed on the optical axis. A value −400 of a surface interval shown in S23 of Table 1 indicates that the next surface S24 exists on the right side of S23, and the origin of the local coordinate is disposed in a point having a distance of 400 mm along the optical axis after the reflection. The following surface is also disposed in accordance with the same rule.

In the present example, an inclination or an eccentricity of the local coordinate system of each plane is shown in Table 4. In Table 4, the values of the inclination angle and the eccentricity are shown on the right side of the surface number, ADE denotes a magnitude of the inclination in a plane parallel to the section of FIG. 4, and the display rule is as described above. Moreover, YDE denotes the magnitude of the eccentricity, the eccentricity is set in a direction vertical to the optical axis in a plane parallel to the section of FIG. 4, and a downward eccentricity is assumed to be positive in the section of FIG. 4.

In not only the present example but also second and subsequent examples described later, the inclination or eccentricity of each optical element is set in a direction in a section parallel to the shown section.

It is seen from Tables 1 and 3 that the curvature c and the conic coefficient k are zero. The trapezoidal distortion due to the oblique incidence is excessively largely generated in an oblique incidence direction, and the distortion is small in a direction vertical to the oblique incidence direction. Therefore, largely different functions are required for the oblique incidence direction and the vertical direction, and the asymmetrical aberration can be satisfactorily corrected without utilizing the curvature c or the conic coefficient k that is rotationally symmetrical and that functions every direction.

TABLE 1

| Surface | Rd | TH | nd | vd |
|---------|-----|-----|-----|-----|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5* | −83.708 | 9.00 | 1.49245 | 42.9 |
| S6* | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17* | −27.332 | 10.00 | 1.49245 | 42.9 |
| S18* | −32.424 | 2.50 | | |
| S19 # | Infinity | 8.00 | 1.49245 | 42.9 |
| S20 # | Infinity | 20.51 | | |
| S21 # | Infinity | 8.00 | 1.49245 | 42.9 |
| S22 # | Infinity | 160.99 | | |
| S23 # | Infinity | −400.00 | REFL | |
| S24 | Infinity | 305.00 | REFL | |
| S25 | Infinity | — | | |

TABLE 2

| Surface | | | Non-spherical coefficient | | | | | |
|---------|---|---|---|---|---|---|---|---|
| S5 | K | −11.7678542 | C | −1.159E−11 | F | 2.98642E−20 | J | −1.255E−26 |
| | A | −2.7881E−06 | D | −3.2834E−14 | G | 1.05201E−21 | | |
| | B | 9.67791E−09 | E | 1.09359E−16 | H | 1.96001E−24 | | |
| S6 | K | −5.4064901 | C | 2.0324E−12 | F | 3.0211E−19 | J | −1.4982E−26 |
| | A | 6.14967E−07 | D | −2.2078E−14 | G | 4.30049E−22 | | |
| | B | 4.60362E−09 | E | −8.0538E−17 | H | 4.79618E−24 | | |
| S17 | K | 1.016429122 | C | −9.0262E−11 | F | −1.0521E−18 | J | −6.0837E−26 |
| | A | −1.1068E−05 | D | −1.3984E−13 | G | −8.1239E−23 | | |
| | B | 7.21301E−08 | E | 3.1153E−16 | H | 3.86174E−23 | | |
| S18 | K | 0.742867686 | C | −2.2719E−11 | F | 1.09398E−19 | J | 9.02232E−29 |
| | A | 1.51788E−07 | D | −4.6853E−14 | G | 1.62146E−22 | | |
| | B | 2.10472E−08 | E | 2.9666E−17 | H | −3.0801E−25 | | |

TABLE 3

| Surface | | | Free shaped surface coefficient | | | | | |
|---------|---|---|---|---|---|---|---|---|
| S19 | | | C17 | 5.38933E−07 | C34 | −1.2381E−09 | C51 | −7.4126E−14 |
| | K | 0 | C19 | 8.33432E−07 | C36 | 1.13944E−09 | C53 | 2.05074E−12 |
| | C4 | 0.013500584 | C21 | −4.6367E−08 | C37 | 3.87771E−12 | C55 | −9.2166E−13 |
| | C6 | 0.003493312 | C22 | −6.2643E−09 | C39 | 1.04779E−11 | C56 | −2.5867E−15 |
| | C8 | −0.00083921 | C24 | −2.2449E−08 | C41 | 1.80038E−11 | C58 | −8.7122E−15 |
| | C10 | −0.00032098 | C26 | −5.6706E−08 | C43 | 5.23019E−11 | C60 | 2.85321E−14 |
| | C11 | 8.59459E−06 | C28 | 9.69952E−10 | C45 | 1.69253E−11 | C62 | −8.5084E−14 |
| | C13 | 2.14814E−06 | C30 | −1.1968E−10 | C47 | −2.7E−14 | C64 | 1.25198E−13 |
| | C15 | 7.54355E−06 | C32 | −1.3638E−09 | C49 | 7.30978E−13 | C66 | −5.6277E−14 |

TABLE 3-continued

| Surface | | | | Free shaped surface coefficient | | | | |
|---|---|---|---|---|---|---|---|---|
| S20 | | | C17 | 7.49262E−07 | C34 | −5.7462E−10 | C51 | −3.6141E−13 |
| | K | 0 | C19 | 1.19039E−06 | C36 | 1.27396E−09 | C53 | 8.54188E−14 |
| | C4 | 0.015488689 | C21 | −1.2953E−07 | C37 | −4.7746E−12 | C55 | −5.3469E−13 |
| | C6 | 0.006553414 | C22 | 5.115E−10 | C39 | 7.32855E−12 | C56 | 8.92545E−17 |
| | C8 | −0.00116756 | C24 | −2.1936E−08 | C41 | 5.30157E−11 | C58 | −5.3434E−15 |
| | C10 | −0.00033579 | C26 | −5.9543E−08 | C43 | 5.05014E−11 | C60 | 1.96533E−14 |
| | C11 | 7.5015E−06 | C28 | 2.03972E−08 | C45 | −2.1894E−11 | C62 | −1.3923E−13 |
| | C13 | −2.5728E−06 | C30 | 1.16701E−11 | C47 | −1.2515E−13 | C64 | 1.06322E−13 |
| | C15 | −1.3543E−06 | C32 | −1.6198E−09 | C49 | 7.64489E−13 | C66 | −4.6602E−15 |
| S21 | | | C17 | −1.0379E−07 | C34 | 2.81743E−10 | C51 | −8.1775E−15 |
| | K | 0 | C19 | 3.0082E−08 | C36 | 6.05663E−10 | C53 | 3.06022E−14 |
| | C4 | 0.015096874 | C21 | 7.95521E−08 | C37 | 8.39381E−13 | C55 | −9.1775E−13 |
| | C6 | 0.009982808 | C22 | −1.3911E−09 | C39 | 1.98531E−12 | C56 | −7.8543E−17 |
| | C8 | 0.000358347 | C24 | 9.33292E−10 | C41 | 1.37477E−11 | C58 | −8.9588E−16 |
| | C10 | 0.000209267 | C26 | 3.54468E−09 | C43 | −1.0671E−11 | C60 | −6.0768E−15 |
| | C11 | −3.8593E−07 | C28 | 4.1615E−09 | C45 | 9.04109E−12 | C62 | −1.9528E−14 |
| | C13 | −6.8336E−06 | C30 | −1.2331E−11 | C47 | 2.48401E−14 | C64 | 2.6781E−14 |
| | C15 | −2.2455E−05 | C32 | −2.3367E−10 | C49 | 6.92603E−14 | C66 | −1.4324E−14 |
| S22 | | | C17 | −3.6973E−07 | C34 | 4.8045E−10 | C51 | −2.9795E−13 |
| | K | 0 | C19 | −3.0682E−07 | C36 | 1.43328E−10 | C53 | −2.5306E−14 |
| | C4 | 0.022813527 | C21 | 4.12093E−08 | C37 | −2.0707E−12 | C55 | −3.9401E−13 |
| | C6 | 0.012060543 | C22 | 4.07969E−09 | C39 | −4.9221E−12 | C56 | 6.88651E−16 |
| | C8 | 0.000638931 | C24 | 8.5986E−09 | C41 | −2.3681E−12 | C58 | 1.55006E−15 |
| | C10 | 0.000196027 | C26 | 2.1713E−08 | C43 | −2.1567E−11 | C60 | −1.4674E−15 |
| | C11 | −7.1204E−06 | C28 | 1.63499E−08 | C45 | −2.3679E−12 | C62 | −9.9822E−15 |
| | C13 | −1.269E−05 | C30 | 1.38704E−10 | C47 | −5.7167E−15 | C64 | 2.72925E−14 |
| | C15 | −2.5184E−05 | C32 | 2.02372E−10 | C49 | −9.0337E−14 | C66 | −1.1966E−14 |
| S23 | | | C17 | −1.1083E−09 | C34 | −4.9118E−14 | C51 | −5.4918E−19 |
| | K | 0 | C19 | −5.7768E−10 | C36 | 8.12546E−14 | C53 | −2.2569E−18 |
| | C4 | 0.001597194 | C21 | 1.60076E−10 | C37 | −7.486E−17 | C55 | −3.5657E−18 |
| | C6 | 0.001324181 | C22 | 1.91534E−12 | C39 | 6.80626E−16 | C56 | 1.09883E−21 |
| | C8 | 1.37885E−05 | C24 | −1.0665E−11 | C41 | −5.1295E−17 | C58 | −2.1535E−20 |
| | C10 | 1.34349E−05 | C26 | −8.6063E−12 | C43 | −3.6526E−16 | C60 | 2.01763E−20 |
| | C11 | −4.8064E−08 | C28 | −1.1125E−12 | C45 | 1.46399E−15 | C62 | −1.2016E−20 |
| | C13 | 5.24071E−08 | C30 | 6.24714E−14 | C47 | −2.1563E−18 | C64 | 3.21408E−21 |
| | C15 | 9.53861E−08 | C32 | −3.4381E−14 | C49 | 2.86073E−18 | C66 | −1.4922E−19 |

TABLE 4

| Surface | ADE (°) | YDE(mm) |
|---|---|---|
| S0 | −1.163 | 0.0 |
| S23 | 29.000 | 0.0 |
| S24 | −43.000 | 0.0 |
| S25 | 30.000 | 0.0 |

Moreover, in Table 4, ADE of S23 corresponds to θm shown in FIG. 1, and ADE of S25 corresponds to θs shown in FIG. 1. From both of the values, a value of Expression 3 is 88, and satisfies the above-described conditions. Therefore, the height of the lower part of the screen is reduced more, and the compact optical system is realized.

Figure 6:
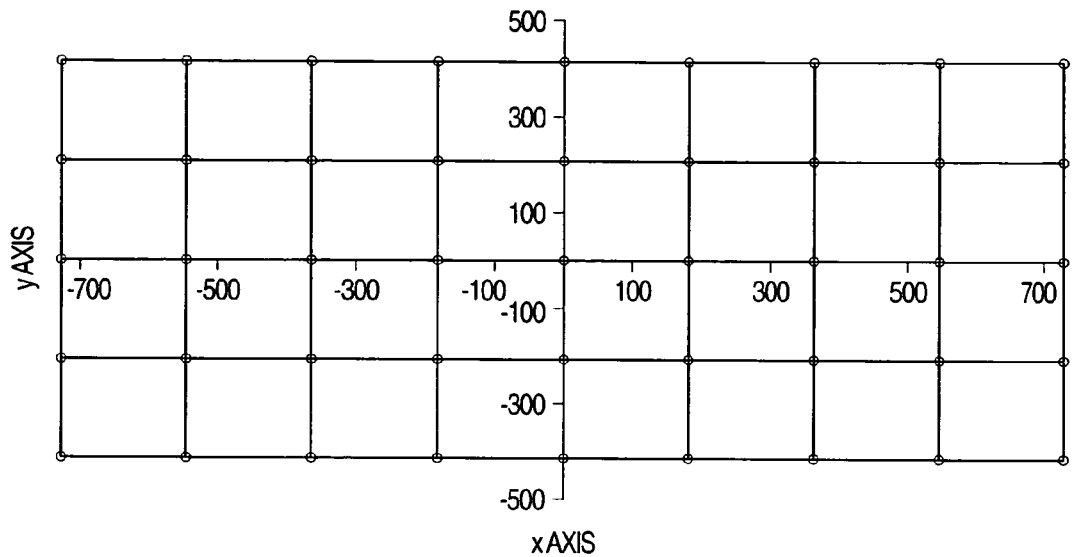
FIG. 6 shows a distortion performance of Embodiment 1 according to the present invention.

Moreover, since a value of a difference |L1−L2| between optical path lengths, represented by Expression 1, is 0.42 time the height of the picture plane of the screen, and θs indicates 30 degrees, the conditions of Expression 1 are satisfied. The numerical values of Tables 1 to 4 indicate one example of a case where an image of a region of 16×9 of the object plane is projected into a size of 1452.8×817.2 on the image plane. A figure distortion in this case is shown in FIG. 6. A vertical direction of FIG. 6 corresponds to a vertical direction of FIG. 5, that is, a Y-axis direction. A lateral direction of FIG. 6 corresponds to a direction vertical to a Y-axis in the screen, and a center of a rectangular shape of a figure corresponds to a center of the picture plane. The drawing shows bent states of straight lines which divide the vertical direction of the picture plane into four and divide the lateral direction into eight, and shows a behavior of the figure distortion.

Figure 7:
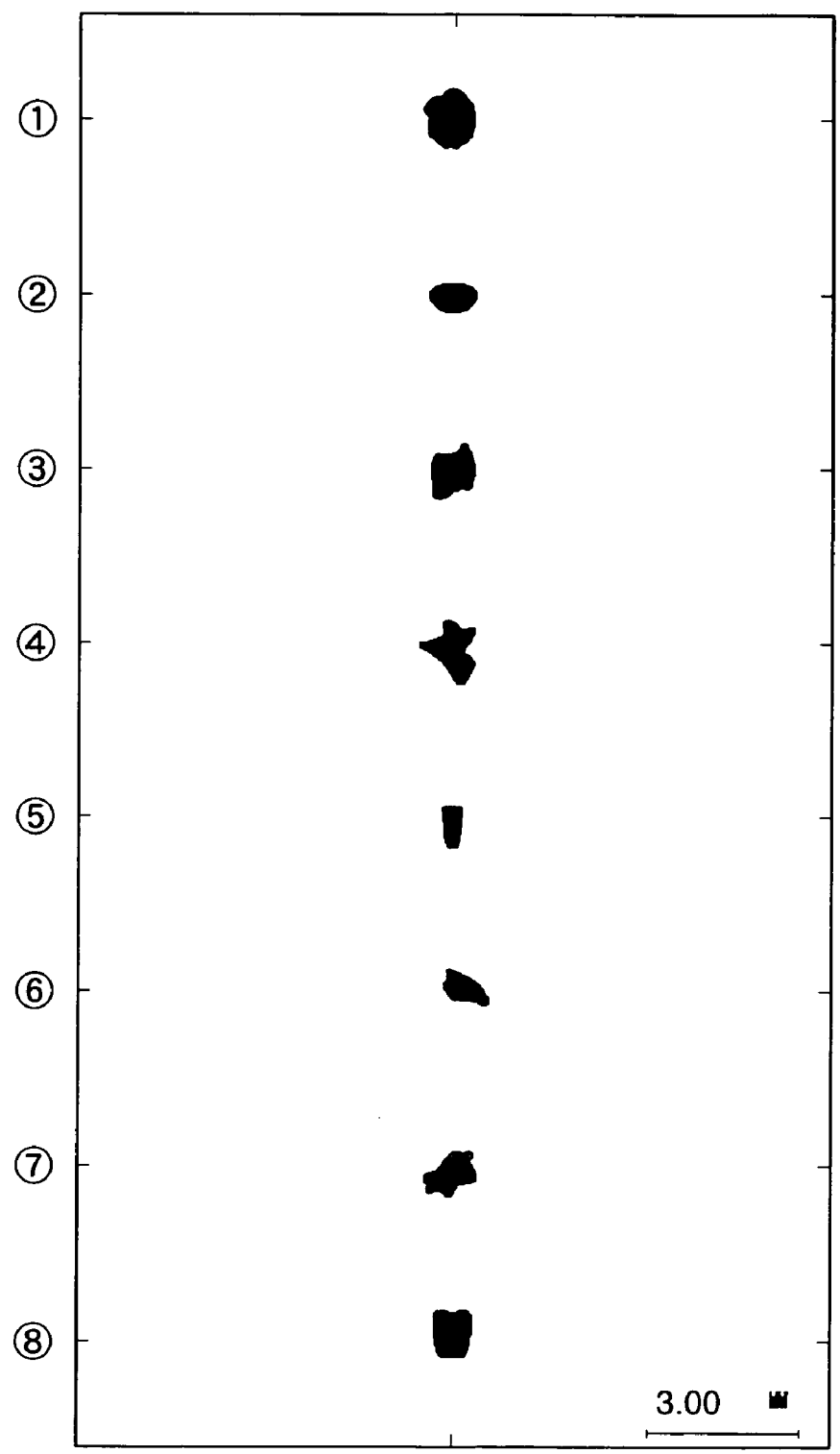
FIG. 7 shows a spot performance of Embodiment 1 according to the present invention.

FIG. 7 shows spot diagrams of the present example. In FIG. 7, there are shown in order from above spot diagrams of luminous fluxes emitted from eight points (8, 4.5), (0, 4.5), (4.8, 2.7), (8, 0), (0, 0), (4.8, −2.7), (8, −4.5), and (0, −4.5) in terms of values of the X, Y coordinate in the display picture plane of the image display element 51. A unit is mm. The lateral direction of each spot diagram corresponds to an X-direction in the screen, and the vertical direction corresponds to a Y-direction in the screen. Satisfactory performances are maintained in both of the directions.

EXAMPLE 2

Next, a second example will be described.

Figure 9:
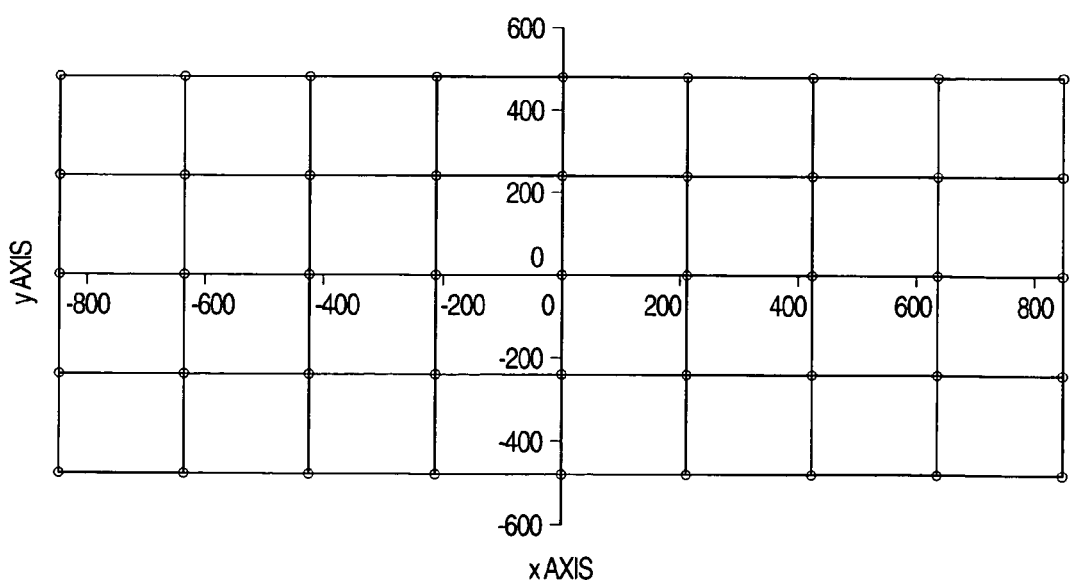
FIG. 9 shows a distortion performance of Embodiment 2 according to the present invention.

A second typical example of a projection optical unit according to the present invention will be described with reference to FIGS. 8 to 10 and Tables 5 to 8.

Figure 8:
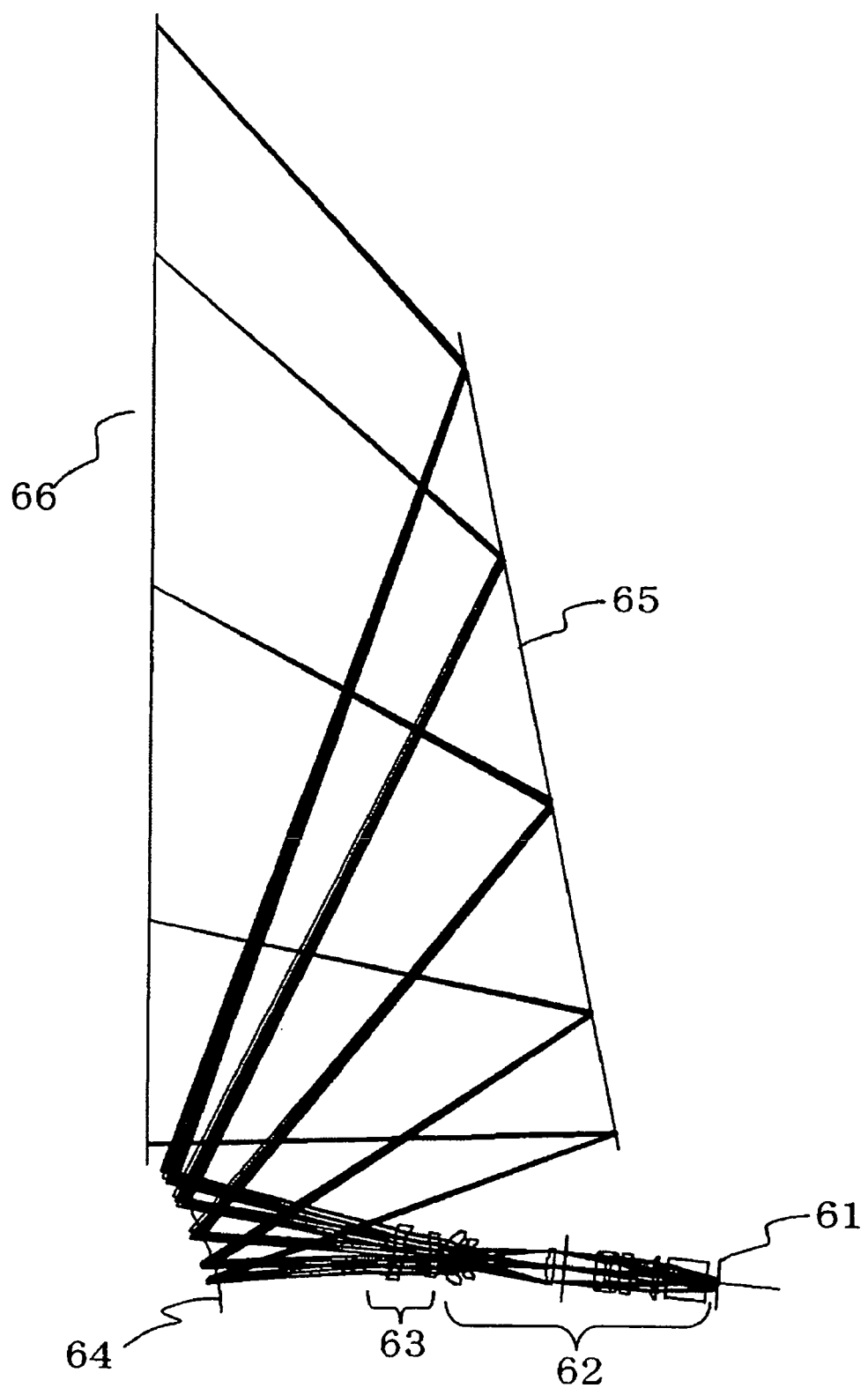
FIG. 8 is a sectional view showing a constitution and an optical path in Embodiment 2 according to the present invention.

FIG. 8 shows a ray diagram of a second numerical value example of the present invention. Light emitted from an image display element 61 displayed on a lower side of FIG. 8 first passes, in order, through a front group 62 of a first optical system including transmission type lenses having rotationally symmetrical surface shapes, and a rear group 63 of the first optical system including transmission type lenses having free shaped surfaces. Thereafter, the light is reflected by a reflection surface 64 having a free shaped surface of a second optical system, and reflected by a flat rear mirror 65 before entering a screen 66.

Here, the front group 62 of the first optical system includes a plurality of refraction surfaces which are all rotationally symmetrical, four of the respective refraction surfaces are rotationally symmetrical non-spherical surfaces, and the other surfaces are spherical. The axially symmetrical non-spherical surface used herein is represented by Expression 1 described above by use of a local cylindrical coordinate system for each plane.

The free shaped surfaces constituting the rear group 63 of the first optical system are represented by Expression 2 including the polynomial expression of X, Y as described above by use of a local orthogonal coordinate system (x, y, z) in which a surface vertex of each surface is an origin.

Table 5 shows lens data of the present numerical value example. Surface numbers are shown in order from an object surface S0, S1 to S24, and an image surface S25. In Table 5, Rd denotes a curvature radius of each surface, indicates a positive value in a case where there is a center of the curvature on the left side of the plane in FIG. 8, and indicates a negative value in a reverse case. In Table 5, TH denotes a distance between surfaces, and indicates a distance between a vertex of a lens surface and that of the next lens surface. As to the associated lens surface, the distance between the surfaces indicates the positive value in a case where the next lens surface is on the left side in FIG. 8, and indicates the negative value in a case where the surface is on the right side. In Table 5, S5, S6, S17, and S18 denote rotationally symmetrical non-spherical surfaces, and * are attached to the surface numbers in Table 5 in such a manner that they are easily seen. The coefficients of these four non-spherical surfaces are shown in Table 6.

In Table 5, S19 to S22 are refraction surfaces having free shaped surfaces constituting the rear group of the first optical system, and S23 provided with # attached to the surface number denotes the reflection surface having the free shaped surface in the second optical system. The values of the coefficients indicating these five free shaped surfaces are shown in Table 7.

TABLE 5

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.65 | | |
| S3 | 210.000 | 4.65 | 1.85306 | 17.2 |
| S4 | −92.276 | 18.00 | | |
| S5* | −119.154 | 9.00 | 1.49245 | 42.9 |
| S6* | −99.255 | 0.10 | | |
| S7 | 41.165 | 9.32 | 1.49811 | 60.9 |
| S8 | −43.298 | 2.50 | 1.76014 | 20.0 |
| S9 | 29.535 | 0.10 | | |
| S10 | 29.472 | 9.00 | 1.49811 | 60.9 |
| S11 | −81.846 | 25.90 | | |
| S12 | Infinity | 9.10 | | |
| S13 | −259.960 | 6.00 | 1.85306 | 17.2 |
| S14 | −54.061 | 65.00 | | |
| S15 | −24.878 | 4.19 | 1.74702 | 33.2 |
| S16 | −64.884 | 9.00 | | |
| S17* | −29.009 | 10.00 | 1.49245 | 42.9 |
| S18* | −28.892 | 2.50 | | |
| S19 # | Infinity | 8.00 | 1.49245 | 42.9 |
| S20 # | Infinity | 20.51 | | |
| S21 # | Infinity | 8.00 | 1.49245 | 42.9 |
| S22 # | Infinity | 159.95 | | |
| S23 # | Infinity | −470.00 | REFL | |
| S24 | Infinity | 382.00 | REFL | |
| S25 | Infinity | — | | |

TABLE 6

| Surface | | | Non-spherical coefficient | | | | | | |
|---|---|---|---|---|---|---|---|---|---|
| S5 | K | −23.3033479 | C | −9.6351E−12 | F | 6.40059E−20 | J | 5.14145E−27 |
| | A | −2.4809E−06 | D | −3.1244E−14 | G | −2.06E−22 | | |
| | B | 6.68597E−09 | E | 1.70809E−16 | H | −1.9587E−24 | | |
| S6 | K | −7.95321673 | C | −2.8461E−12 | F | 1.68916E−19 | J | −4.2604E−27 |
| | A | 8.81129E−07 | D | −4.2436E−16 | G | −4.7764E−22 | | |
| | B | 3.27597E−09 | E | −2.4174E−17 | H | 3.1265E−24 | | |
| S17 | K | 1.294916014 | C | −8.1246E−11 | F | −8.1666E−19 | J | −9.4083E−26 |
| | A | −1.7719E−05 | D | −1.8651E−13 | G | 7.81036E−22 | | |
| | B | 5.73314E−08 | E | 2.9427E−16 | H | 3.77766E−23 | | |
| S18 | K | 0.463935076 | C | −1.1724E−11 | F | 1.23091E−19 | J | −2.0819E−28 |
| | A | −3.417E−06 | D | −5.4303E−14 | G | 1.99428E−22 | | |
| | B | 1.57331E−08 | E | 1.37371E−17 | H | −3.4914E−25 | | |

TABLE 7

| Surface | | | Free shaped surface coefficient | | | | | |
|---|---|---|---|---|---|---|---|---|
| S19 | | | C17 | 5.06259E−07 | C34 | −1.4837E−09 | C51 | −1.0027E−12 |
| | K | 0 | C19 | 4.85077E−07 | C36 | 1.31263E−09 | C53 | 6.99745E−13 |
| | C4 | 0.017559144 | C21 | −1.5853E−07 | C37 | 1.83299E−12 | C55 | −1.6619E−12 |
| | C6 | 0.001733207 | C22 | −5.42E−09 | C39 | −4.3583E−13 | C56 | −1.9766E−15 |
| | C8 | −0.00066382 | C24 | −1.5702E−08 | C41 | 2.72981E−11 | C58 | 1.40369E−15 |
| | C10 | −0.00013226 | C26 | −5.9063E−08 | C43 | 3.0878E−11 | C60 | 1.05828E−14 |
| | C11 | 8.26618E−06 | C28 | −7.7982E−09 | C45 | 2.26152E−11 | C62 | −8.9296E−14 |
| | C13 | 1.03545E−06 | C30 | −1.0233E−10 | C47 | 2.99348E−14 | C64 | 7.84407E−14 |
| | C15 | 8.99822E−06 | C32 | −8.8036E−10 | C49 | 4.57827E−13 | C66 | −9.1078E−14 |
| S20 | | | C17 | 7.92636E−07 | C34 | −1.6758E−09 | C51 | −3.5813E−13 |
| | K | 0 | C19 | 8.89146E−07 | C36 | 1.45469E−09 | C53 | 6.84539E−13 |
| | C4 | 0.021458089 | C21 | −1.4324E−07 | C37 | −7.7649E−12 | C55 | −1.511E−12 |
| | C6 | 0.004154169 | C22 | −1.0382E−09 | C39 | −2.0012E−12 | C56 | 1.77674E−15 |
| | C8 | −0.00099953 | C24 | −1.3146E−08 | C41 | 5.28532E−11 | C58 | 5.96659E−15 |
| | C10 | −0.00011911 | C26 | −5.677E−08 | C43 | 2.30872E−11 | C60 | −2.0891E−15 |
| | C11 | 8.42605E−06 | C28 | 6.05026E−09 | C45 | 1.03045E−11 | C62 | −9.4541E−14 |

TABLE 7-continued

| Surface | | | | Free shaped surface coefficient | | | | |
|---|---|---|---|---|---|---|---|---|
| | C13 | −6.6069E−06 | C30 | 2.65443E−11 | C47 | −1.2622E−13 | C64 | 1.01913E−13 |
| | C15 | −3.2455E−07 | C32 | −1.5185E−09 | C49 | 7.4513E−13 | C66 | −8.0588E−14 |
| S21 | | | C17 | −1.0996E−07 | C34 | 6.726E−11 | C51 | −1.0707E−13 |
| | K | 0 | C19 | 1.27907E−07 | C36 | 7.7809E−10 | C53 | −6.8789E−14 |
| | C4 | 0.016481821 | C21 | 1.59073E−07 | C37 | 1.78369E−12 | C55 | −1.3595E−12 |
| | C6 | 0.009814027 | C22 | −2.3156E−09 | C39 | 5.1641E−12 | C56 | −4.5963E−16 |
| | C8 | 0.000360473 | C24 | −1.533E−10 | C41 | 1.45879E−11 | C58 | −1.5431E−15 |
| | C10 | 0.000256882 | C26 | 6.12508E−09 | C43 | 4.21499E−12 | C60 | −9.4112E−15 |
| | C11 | −1.2641E−06 | C28 | 4.69033E−09 | C45 | 2.24112E−11 | C62 | −1.7181E−14 |
| | C13 | −7.1071E−06 | C30 | −3.0818E−11 | C47 | 5.4765E−14 | C64 | 1.14179E−14 |
| | C15 | −2.6709E−05 | C32 | −3.7474E−10 | C49 | 3.77477E−14 | C66 | −1.4481E−14 |
| S22 | | | C17 | −4.2509E−07 | C34 | 6.03428E−10 | C51 | −4.5666E−13 |
| | K | 0 | C19 | −2.8996E−07 | C36 | 2.79273E−10 | C53 | −1.1058E−13 |
| | C4 | 0.024865431 | C21 | 1.2041E−08 | C37 | −1.9296E−12 | C55 | −5.1945E−13 |
| | C6 | 0.013574823 | C22 | 4.59025E−09 | C39 | −4.3532E−12 | C56 | 5.15206E−16 |
| | C8 | 0.000656946 | C24 | 9.31761E−09 | C41 | −1.0393E−11 | C58 | 1.80646E−15 |
| | C10 | 0.00023588 | C26 | 3.01345E−08 | C43 | −1.737E−11 | C60 | −1.4435E−16 |
| | C11 | −9.5439E−06 | C28 | 2.56904E−08 | C45 | −6.9004E−13 | C62 | −1.1182E−14 |
| | C13 | −1.3485E−05 | C30 | 1.87694E−10 | C47 | −2.2366E−16 | C64 | 1.55635E−14 |
| | C15 | −3.0664E−05 | C32 | 1.26944E−10 | C49 | −1.2748E−13 | C66 | −1.4201E−14 |
| S23 | | | C17 | −9.3593E−10 | C34 | −4.9686E−14 | C51 | 1.8026E−18 |
| | K | 0 | C19 | −6.409E−10 | C36 | −5.1319E−14 | C53 | −8.6197E−18 |
| | C4 | 0.001494744 | C21 | 3.91751E−10 | C37 | −8.103E−17 | C55 | 1.1354E−17 |
| | C6 | 0.001287983 | C22 | 1.80884E−12 | C39 | 5.19251E−16 | C56 | 1.89778E−21 |
| | C8 | 1.19776E−05 | C24 | −8.191E−12 | C41 | 1.38639E−16 | C58 | −1.6083E−20 |
| | C10 | 1.18228E−05 | C26 | −7.7154E−12 | C43 | −8.0016E−16 | C60 | 9.98054E−21 |
| | C11 | −4.3922E−08 | C28 | 9.92084E−14 | C45 | 2.67935E−16 | C62 | 4.42337E−21 |
| | C13 | 3.28597E−08 | C30 | 4.90899E−14 | C47 | −1.5465E−18 | C64 | −1.4286E−20 |
| | C15 | 8.20779E−08 | C32 | −1.3332E−14 | C49 | 1.58291E−18 | C66 | 6.04404E−21 |

TABLE 8

| Surface | ADE (°) | YDE(mm) |
|---|---|---|
| S0 | −1.289 | 0.0 |
| S15 | 0.0 | −0.193 |
| S17 | 0.0 | 0.193 |
| S23 | 28.814 | 0.0 |
| S24 | −41.000 | 0.0 |
| S25 | 29.391 | 0.0 |

Table 8 shows magnitudes of an inclination and an eccentricity of each surface in the present example. In Table 8, rules of indications of values of ADE and YDE are as described above. The inclination of each surface in the present example has an amount substantially equal to that of Example 1.

In Table 8, when a value of Expression 3 is calculated from ADE (=θm) of S23 and ADE (=θs) of S25, the value is 87.019. This satisfies the above-described conditions, and realizes a compact optical system which satisfies the above-described conditions and in which the height of the lower part of the screen is small.

Moreover, since a value of a difference |L1−L2| between optical path lengths, represented by Expression 1, is 0.43 time the height of the picture plane of the screen, and θs indicates 30 degrees, the conditions of Expression 1 are satisfied.

On the other hand, in the present example, as shown in Table 8, S15 is set to be eccentric by −0.193 mm, and, conversely, the surface S17 is eccentric by 0.193 mm. When a certain surface is eccentric, the optical axis in the next surface moves as much as the eccentricity. Therefore, the eccentricities of S15 and S17 mean that one lens constituted of S15 and S16 is eccentric by −0.193 mm from the optical axis. This eccentricity has a micro amount, and does not have such an adverse influence as to enlarge the size of the lens. This eccentricity realizes minute adjustment of asymmetrical chromatic aberration.

It is seen from Tables 4 and 6 that in the present example, a curvature c and a conic coefficient k are zero. The trapezoidal distortion due to the oblique incidence is excessively largely generated in an oblique incidence direction, and the distortion is small in a direction vertical to the oblique incidence direction. Therefore, largely different functions are required for the oblique incidence direction and the vertical direction, and the figure distortion can be satisfactorily eliminated without utilizing the curvature c or the conic coefficient k that is rotationally symmetrical and that functions every direction.

As to an effective region of the present numerical value example, an image of a region of 16×9 of the object plane is projected into a size of 1694.9×953.4 on the image plane. A figure distortion in this case is shown in FIG. 9. A vertical direction of FIG. 9 corresponds to a vertical direction of FIG. 8, that is, a Y-axis direction. A lateral direction of FIG. 9 corresponds to a direction vertical to a Y-axis in the screen, and a center of a rectangular shape of a figure corresponds to a center of the picture plane. The drawing shows bent states of straight lines which divide the vertical direction of the picture plane into four and divide the lateral direction into eight, and shows a behavior of the figure distortion.

Figure 10:
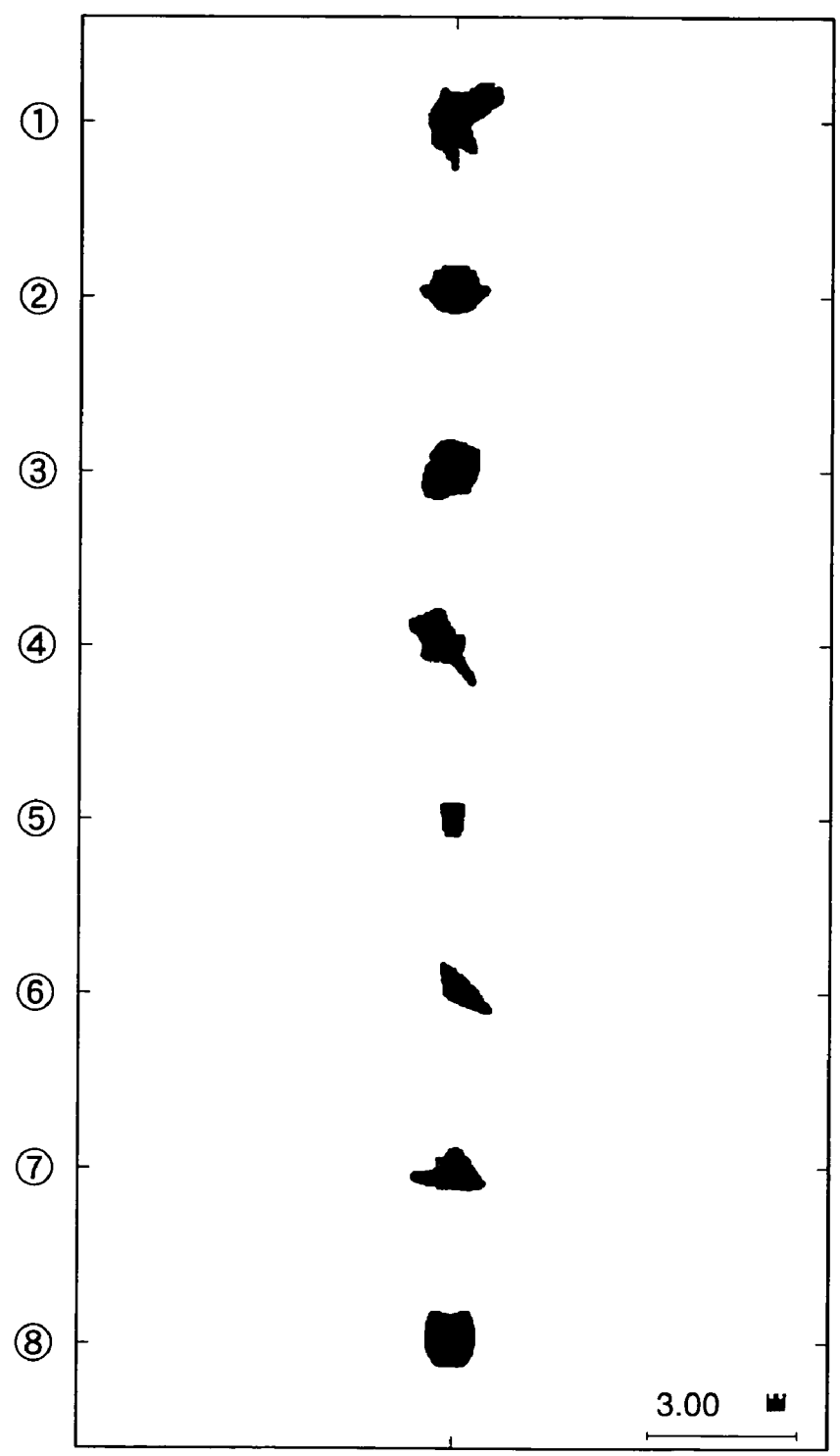
FIG. 10 shows a spot performance of Embodiment 2 according to the present invention.

FIG. 10 shows spot diagrams of the present numerical value example. In FIG. 10, there are shown in order from above spot diagrams of luminous fluxes emitted from eight points (8, 4.5), (0, 4.5), (4.8, 2.7), (8, 0), (0, 0), (4.8, −2.7), (8, −4.5), and (0, −4.5) in terms of values of the X, Y coordinate in the display picture plane of the image display element 61. A unit is mm. The lateral direction of each spot diagram corresponds to an X-direction in the screen, and the vertical direction corresponds to a Y-direction in the screen. Satisfactory performances are maintained in both of the directions.

EXAMPLE 3

A third numerical value example according to the present invention will be described with reference to FIGS. 11 to 13 and Tables 9 to 12.

Figure 11:
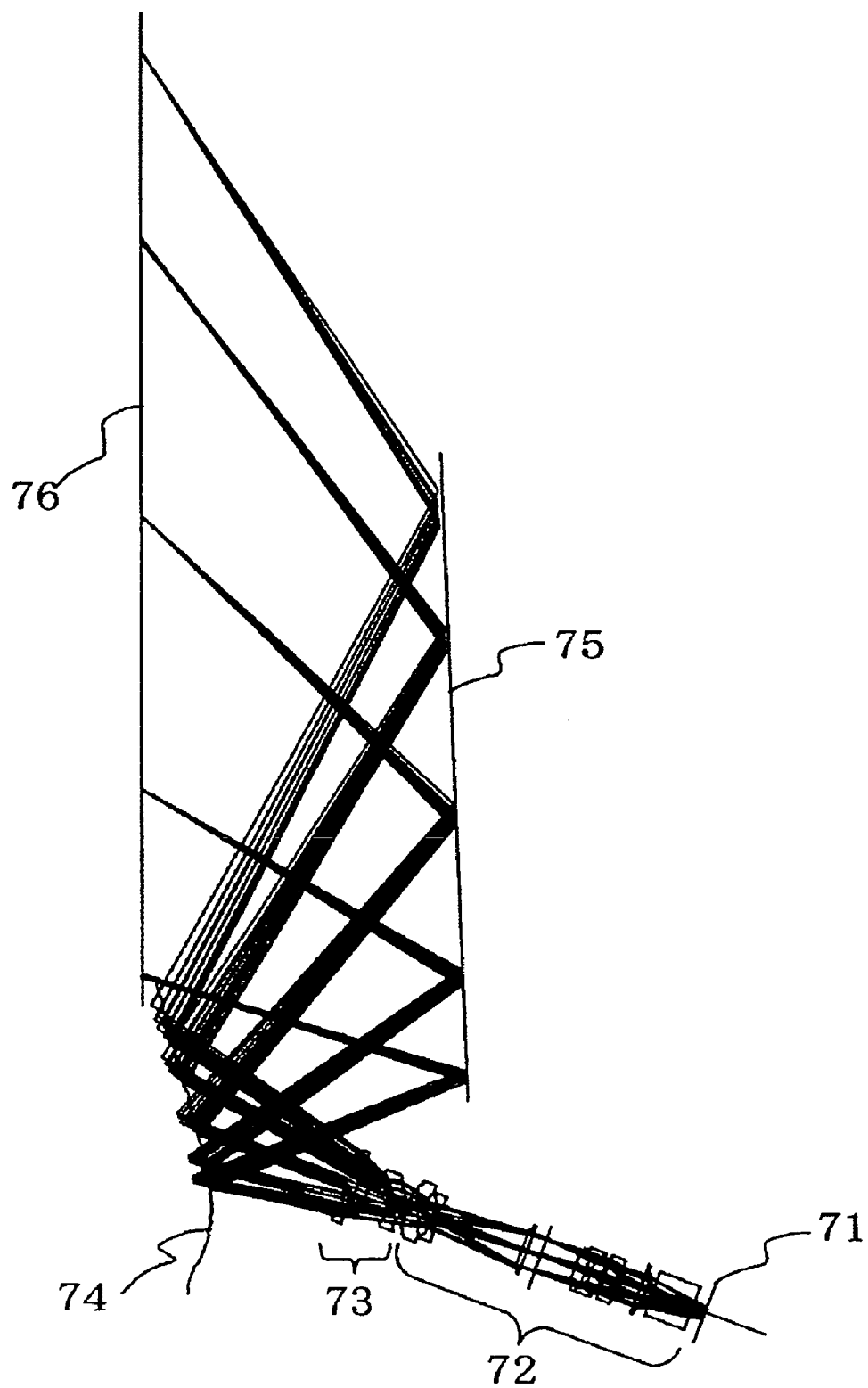
FIG. 11 is a sectional view showing a constitution and an optical path in Embodiment 3 according to the present invention.
Figure 12:
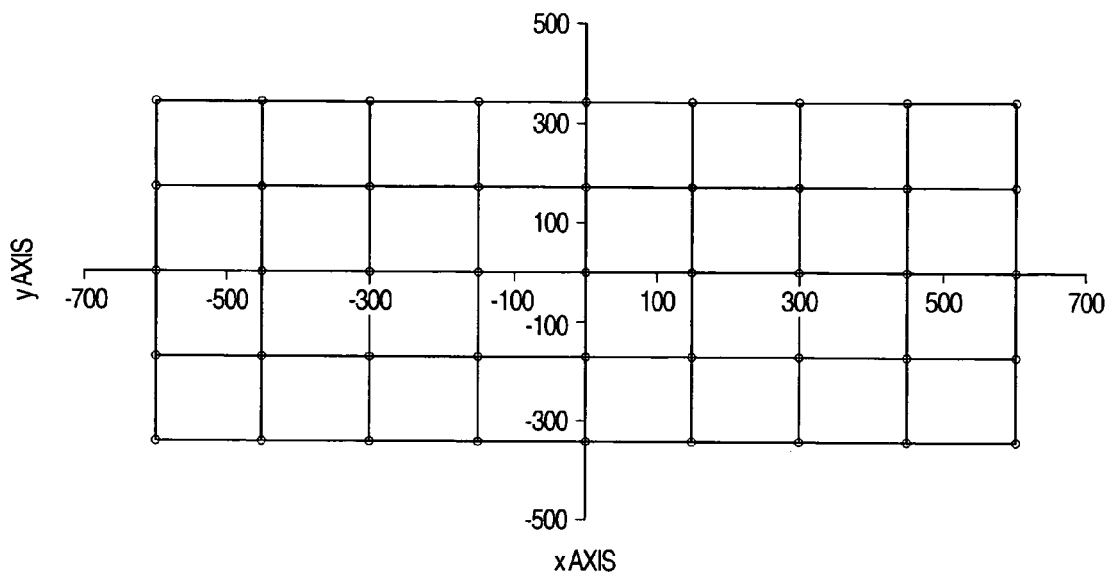
FIG. 12 shows a distortion performance of Embodiment 3 according to the present invention.

FIG. 11 shows a ray diagram of a third numerical value example of the present invention. Light emitted from an image display element 71 displayed on a lower side of FIG. 11 first passes, in order, through a front group 72 of a first optical system including transmission type lenses having rotationally symmetrical surface shapes, and a rear group 73 of the first optical system including transmission type lenses having free shaped surfaces. Thereafter, the light is reflected by a reflection surface 74 having a free shaped surface of a second optical system, and reflected by a flat rear mirror 75 before entering a screen 76. Here, the front group 72 of the first optical system includes refraction surfaces which are all rotationally symmetrical, four of the respective refraction surfaces are rotationally symmetrical non-spherical surfaces, and the other surfaces are spherical. The axially symmetrical non-spherical surface used herein is represented by Expression 1 described above by use of a local cylindrical coordinate system for each plane.

The free shaped surfaces constituting the rear group 73 of the first optical system are represented by Expression 2 including the polynomial expression of X, Y as described above by use of a local orthogonal coordinate system (x, y, z) in which a surface vertex of each surface is an origin.

TABLE 9

| Surface | Rd | TH | nd | νd |
|---|---|---|---|---|
| S0 | Infinity | 10.00 | | |
| S1 | Infinity | 31.34 | 1.51827 | 48.0 |
| S2 | Infinity | 5.00 | | |
| S3 | 69.501 | 4.65 | 1.85306 | 17.2 |
| S4 | −477.064 | 18.00 | | |
| S5* | −54.329 | 9.00 | 1.49245 | 42.9 |
| S6* | −53.208 | 0.10 | | |
| S7 | 48.857 | 9.32 | 1.49811 | 60.9 |
| S8 | −29.376 | 2.50 | 1.76014 | 20.0 |
| S9 | 40.402 | 0.10 | | |
| S10 | 40.607 | 9.00 | 1.49811 | 60.9 |
| S11 | −54.359 | 25.90 | | |
| S12 | Infinity | 9.10 | | |
| S13 | 2090.112 | 6.00 | 1.85306 | 17.2 |
| S14 | −66.019 | 65.00 | | |
| S15 | −45.540 | 4.19 | 1.74702 | 33.2 |
| S16 | 108.965 | 9.00 | | |
| S17* | −37.449 | 10.00 | 1.49245 | 42.9 |
| S18* | −75.474 | 2.50 | | |
| S19 # | Infinity | 8.00 | 1.49245 | 42.9 |
| S20 # | Infinity | 19.35 | | |
| S21 # | Infinity | 8.00 | 1.49245 | 42.9 |
| S22 # | Infinity | 122.15 | | |
| S23 # | Infinity | −288.00 | REFL | |
| S24 | Infinity | 317.00 | REFL | |
| S25 | Infinity | — | | |

TABLE 10

| Surface | | | Non-spherical coefficient | | | | | |
|---|---|---|---|---|---|---|---|---|
| S5 | K | −13.108806 | C | 1.46508E−11 | F | −2.0555E−19 | J | 8.25281E−27 |
| | A | −2.6018E−06 | D | −4.7767E−14 | G | 1.12416E−21 | | |
| | B | 1.95435E−08 | E | −1.5302E−16 | H | −7.5179E−25 | | |
| S6 | K | −8.59084843 | C | 1.51155E−11 | F | −1.6279E−19 | J | 1.22719E−26 |
| | A | 7.67114E−07 | D | −4.743E−15 | G | −1.8394E−21 | | |
| | B | 9.20816E−09 | E | −9.3745E−17 | H | 3.4992E−24 | | |
| S17 | K | 3.170476396 | C | −4.2843E−12 | F | 1.18119E−18 | J | 2.06192E−26 |
| | A | −8.7308E−06 | D | 1.96465E−13 | G | −4.5716E−21 | | |
| | B | −3.8136E−08 | E | 7.89179E−16 | H | −1.5681E−23 | | |
| S18 | K | 9.315246698 | C | 2.51005E−11 | F | −5.9791E−20 | J | 3.13406E−28 |
| | A | −4.2604E−06 | D | 3.09426E−14 | G | −6.6563E−23 | | |
| | B | −1.5518E−08 | E | −8.892E−18 | H | 7.14735E−26 | | |

TABLE 11

| Surface | | | | | Free shaped surface coefficient | | | | |
|---|---|---|---|---|---|---|---|---|---|
| S19 | | | C17 | 3.43096E−07 | C34 | −2.7065E−10 | C51 | 1.99077E−13 | |
| | K | 0 | C19 | 2.13857E−06 | C36 | 1.31926E−09 | C53 | −5.2135E−12 | |
| | C4 | −0.00503963 | C21 | 9.15856E−08 | C37 | 2.1077E−12 | C55 | −2.1831E−12 | |
| | C6 | 0.020700865 | C22 | −1.9441E−09 | C39 | −6.1349E−11 | C56 | −3.3204E−15 | |
| | C8 | −0.0007276 | C24 | −9.6181E−09 | C41 | −6.9182E−11 | C58 | 1.52276E−14 | |
| | C10 | −0.00062901 | C26 | 2.71279E−09 | C43 | −1.1634E−10 | C60 | 4.722E−14 | |
| | C11 | 4.83792E−06 | C28 | 1.5813E−08 | C45 | 1.55247E−11 | C62 | 3.79581E−14 | |
| | C13 | 1.58097E−05 | C30 | −4.1204E−10 | C47 | 1.79452E−14 | C64 | 3.11821E−14 | |
| | C15 | −1.9636E−05 | C32 | −2.3107E−09 | C49 | −6.0452E−13 | C66 | −1.876E−13 | |
| S20 | | | C17 | 6.40078E−08 | C34 | −1.0668E−09 | C51 | −4.5767E−13 | |
| | K | 0 | C19 | 2.35312E−06 | C36 | −3.2106E−10 | C53 | −3.1387E−12 | |
| | C4 | −0.00417899 | C21 | 9.31605E−07 | C37 | 1.82824E−12 | C55 | 1.09346E−12 | |
| | C6 | 0.031326266 | C22 | −5.0811E−10 | C39 | −2.9101E−11 | C56 | −1.6513E−15 | |
| | C8 | −0.00077771 | C24 | −3.1548E−08 | C41 | 1.04208E−10 | C58 | 8.47256E−15 | |
| | C10 | −0.00097819 | C26 | −8.825E−08 | C43 | 7.01421E−11 | C60 | −1.694E−15 | |
| | C11 | 2.05947E−06 | C28 | 3.84368E−08 | C45 | −1.0493E−10 | C62 | −1.7011E−13 | |
| | C13 | 2.31241E−05 | C30 | −9.4717E−11 | C47 | 2.95795E−14 | C64 | 6.71828E−14 | |
| | C15 | −3.0456E−05 | C32 | −8.4146E−10 | C49 | −7.9902E−13 | C66 | 1.92712E−14 | |
| S21 | | | C17 | −1.4263E−07 | C34 | −1.7091E−10 | C51 | −4.2269E−14 | |
| | K | 0 | C19 | −3.1384E−08 | C36 | −2.9029E−10 | C53 | 2.21959E−14 | |
| | C4 | 0.016712489 | C21 | 3.78605E−07 | C37 | 2.14998E−13 | C55 | −9.5144E−15 | |
| | C6 | 0.024854646 | C22 | 7.83561E−10 | C39 | 1.12281E−12 | C56 | −1.3876E−16 | |

TABLE 11-continued

| Surface | | | | Free shaped surface coefficient | | | | |
|---|---|---|---|---|---|---|---|---|
| | C8 | 0.000280556 | C24 | −1.1076E−09 | C41 | 3.49849E−12 | C58 | −2.0224E−16 |
| | C10 | −5.99E−05 | C26 | −5.1644E−09 | C43 | 2.81764E−12 | C60 | 4.00029E−17 |
| | C11 | −4.5381E−06 | C28 | −1.9091E−09 | C45 | −1.5444E−12 | C62 | −4.1764E−15 |
| | C13 | −7.3701E−06 | C30 | 2.60008E−11 | C47 | −3.3945E−15 | C64 | 1.05212E−15 |
| | C15 | −1.0002E−05 | C32 | 2.73923E−11 | C49 | 2.75972E−14 | C66 | −3.6542E−15 |
| S22 | | | C17 | −1.7327E−07 | C34 | −3.122E−10 | C51 | −3.8555E−14 |
| | K | 0 | C19 | −1.5061E−07 | C36 | −6.1374E−10 | C53 | 2.3681E−13 |
| | C4 | 0.016645995 | C21 | 5.38912E−07 | C37 | 9.78887E−14 | C55 | 1.87115E−13 |
| | C6 | 0.021101685 | C22 | 8.11263E−10 | C39 | 1.08112E−12 | C56 | −9.9798E−17 |
| | C8 | 0.00032094 | C24 | −1.1477E−10 | C41 | 3.69407E−12 | C58 | −2.3837E−16 |
| | C10 | −5.1172E−05 | C26 | −4.8707E−09 | C43 | −5.8299E−13 | C60 | −2.2734E−16 |
| | C11 | −4.3183E−06 | C28 | −1.1809E−09 | C45 | −3.7079E−12 | C62 | −3.0547E−15 |
| | C13 | −8.5909E−06 | C30 | 3.39643E−11 | C47 | −2.9359E−15 | C64 | 5.55175E−15 |
| | C15 | −1.0155E−05 | C32 | 1.47622E−10 | C49 | −5.9302E−15 | C66 | −1.0145E−15 |
| S23 | | | C17 | −2.203E−09 | C34 | 8.2099E−14 | C51 | −1.2799E−17 |
| | K | 0 | C19 | 2.39237E−09 | C36 | −4.3614E−14 | C53 | 4.0335E−18 |
| | C4 | 0.002149003 | C21 | 1.39506E−09 | C37 | −1.7915E−16 | C55 | −3.2746E−18 |
| | C6 | 0.000317113 | C22 | 4.22192E−12 | C39 | 1.80308E−15 | C56 | 3.62609E−21 |
| | C8 | 2.85992E−05 | C24 | −3.3322E−11 | C41 | −2.7999E−15 | C58 | −3.5037E−20 |
| | C10 | 9.52914E−06 | C26 | 1.45814E−11 | C43 | 7.24461E−16 | C60 | 6.79833E−20 |
| | C11 | −8.2644E−08 | C28 | 1.00262E−11 | C45 | −1.0528E−15 | C62 | −3.7507E−20 |
| | C13 | 2.89938E−07 | C30 | 1.34005E−13 | C47 | −4.0973E−18 | C64 | 5.06597E−21 |
| | C15 | 1.20082E−07 | C32 | −3.6767E−13 | C49 | 1.4053E−17 | C66 | 5.93238E−21 |

TABLE 12

| Surface | ADE (°) | YDE(mm) |
|---|---|---|
| S0 | −2.000 | 0.0 |
| S15 | 0.0 | 0.304 |
| S17 | 0.0 | −0.304 |
| S23 | 35.000 | 0.0 |
| S24 | −47.500 | 0.0 |
| S25 | 45.000 | 0.0 |

Table 9 shows lens data of the present numerical value example. Surface numbers are shown in order from an object surface S0, S1 to S24, and an image surface S25. In Table 9, Rd denotes a curvature radius of each surface, indicates a positive value in a case where there is a center of the curvature on the left side of the plane in FIG. 8, and indicates a negative value in a reverse case.

In Table 9, TH denotes a distance between surfaces, and indicates a distance between a vertex of a lens surface and that of the next lens surface. As to the associated lens surface, the distance between the surfaces indicates the positive value in a case where the next lens surface is on the left side in FIG. 8, and indicates the negative value in a case where the surface is on the right side. In Table 9, S5, S6, S17, and S18 denote rotationally symmetrical non-spherical surfaces, and * are attached to the surface numbers in Table 9 in such a manner that they are easily seen. The coefficients of these four non-spherical surfaces are shown in Table 10.

In Table 9, S19 to S22 are refraction surfaces having free shaped surfaces constituting the rear group of the first optical system, and S23 provided with # attached to the surface number denotes the reflection surface having the free shaped surface in the second optical system. The values of the coefficients indicating these five free shaped surfaces are shown in Table 11.

Table 12 shows magnitudes of an inclination and an eccentricity of each surface in the present example. In Table 12, rules of indications of values of ADE and YDE are as described above.

Referring to Table 12, the conditions of Expression 3 described above are not satisfied. However, the depth is small, and priority is given to the depth in the example.

Moreover, as shown in Table 12, one lens including S5 and S16 is eccentric by −0.304 mm from an optical axis in the same manner as in Example 2 described above. This eccentricity is small, and does not have such an adverse influence as to enlarge the size of the lens. This eccentricity realizes minute adjustment of an asymmetrical chromatic aberration.

Moreover, since a value of a difference |L1−L2| between optical path lengths, represented by Expression 1, is 0.62 time the height of the picture plane of the screen, and θs indicates 45 degrees, the conditions of Expression 1 are satisfied.

It is seen from Tables 12 and 14 that in the present example, a curvature c and a conic coefficient k are zero. The trapezoidal distortion due to the oblique incidence is excessively largely generated in an oblique incidence direction, and the distortion is small in a direction vertical to the oblique incidence direction. Therefore, largely different functions are required for the oblique incidence direction and the vertical direction, and the figure distortion can be satisfactorily eliminated without utilizing the curvature c or the conic coefficient k that is rotationally symmetrical and that functions every direction.

As to an effective region of the present numerical value example, an image of a region of 16×9 of the object plane is projected into a size of 1210.7×681.0 on the image plane. A figure distortion in this case is shown in FIG. 12. A vertical direction of FIG. 12 corresponds to a vertical direction of FIG. 11, that is, a Y-axis direction. A lateral direction of FIG. 12 corresponds to a direction vertical to a Y-axis in the screen, and a center of a rectangular shape of a figure corresponds to a center of the picture plane. The drawing shows bent states of straight lines which divide the vertical direction of the picture plane into four and divide the lateral direction into eight, and shows a behavior of the figure distortion.

Figure 13:
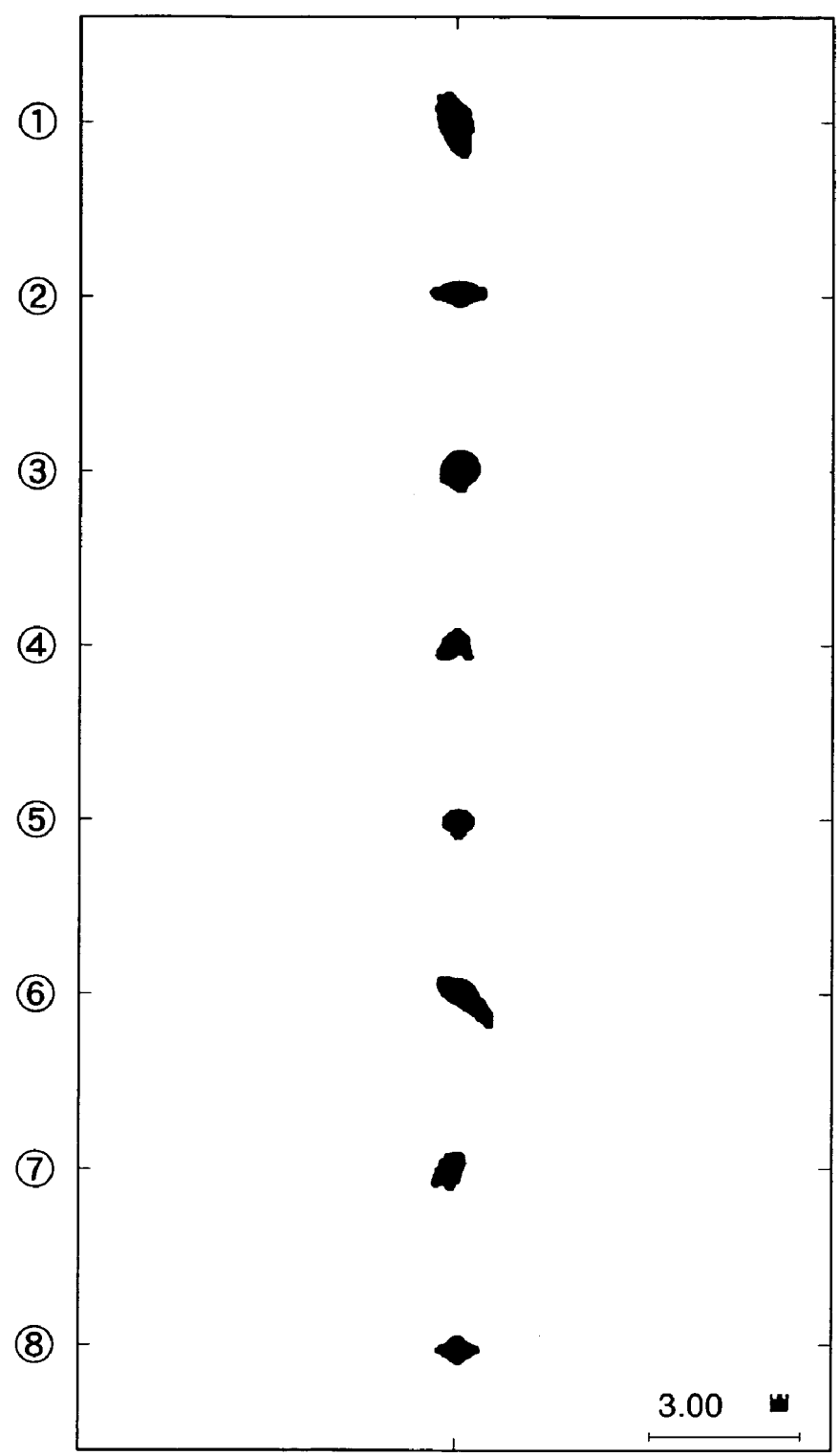
FIG. 13 shows a spot performance of Embodiment 3 according to the present invention.

FIG. 13 shows spot diagrams of the present numerical value example. In FIG. 13, there are shown in order from above spot diagrams of luminous fluxes emitted from eight points (8, 4.5), (0, 4.5), (4.8, 2.7), (8, 0), (0, 0), (4.8, −2.7), (8, −4.5), and (0, −4.5) in terms of values of the X, Y coordinate in the display picture plane of the image display element 71. A unit is mm. The lateral direction of each spot diagram corresponds to an X-direction in the screen, and the vertical direction corresponds to a Y-direction in the screen. Satisfactory performances are maintained in both of the directions.

EXAMPLE 4

Figure 15:
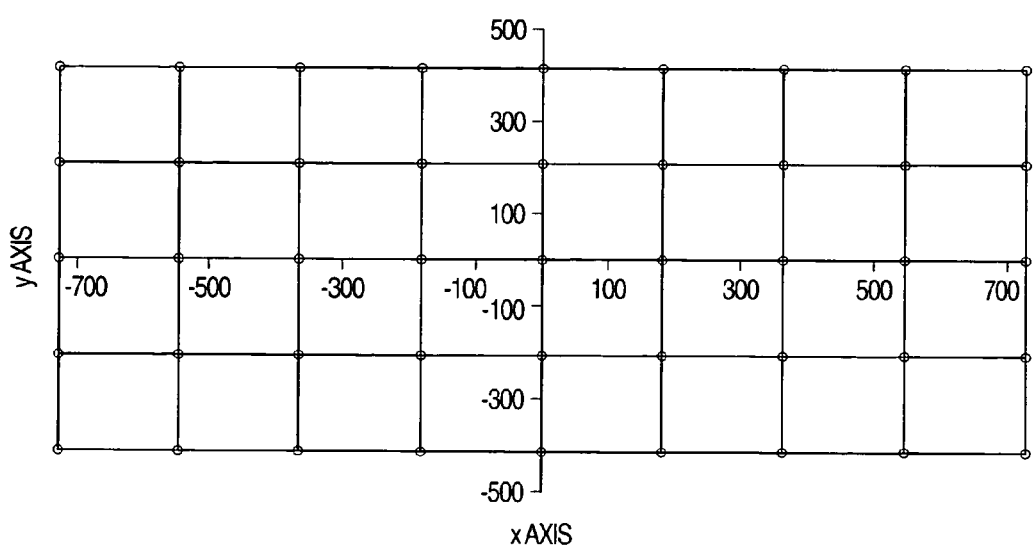
FIG. 15 shows a distortion performance of Embodiment 4 according to the present invention.

A fourth numerical value example according to the present invention will be described with reference to FIGS. 14 to 16 and Tables 13 to 16.

Figure 14:
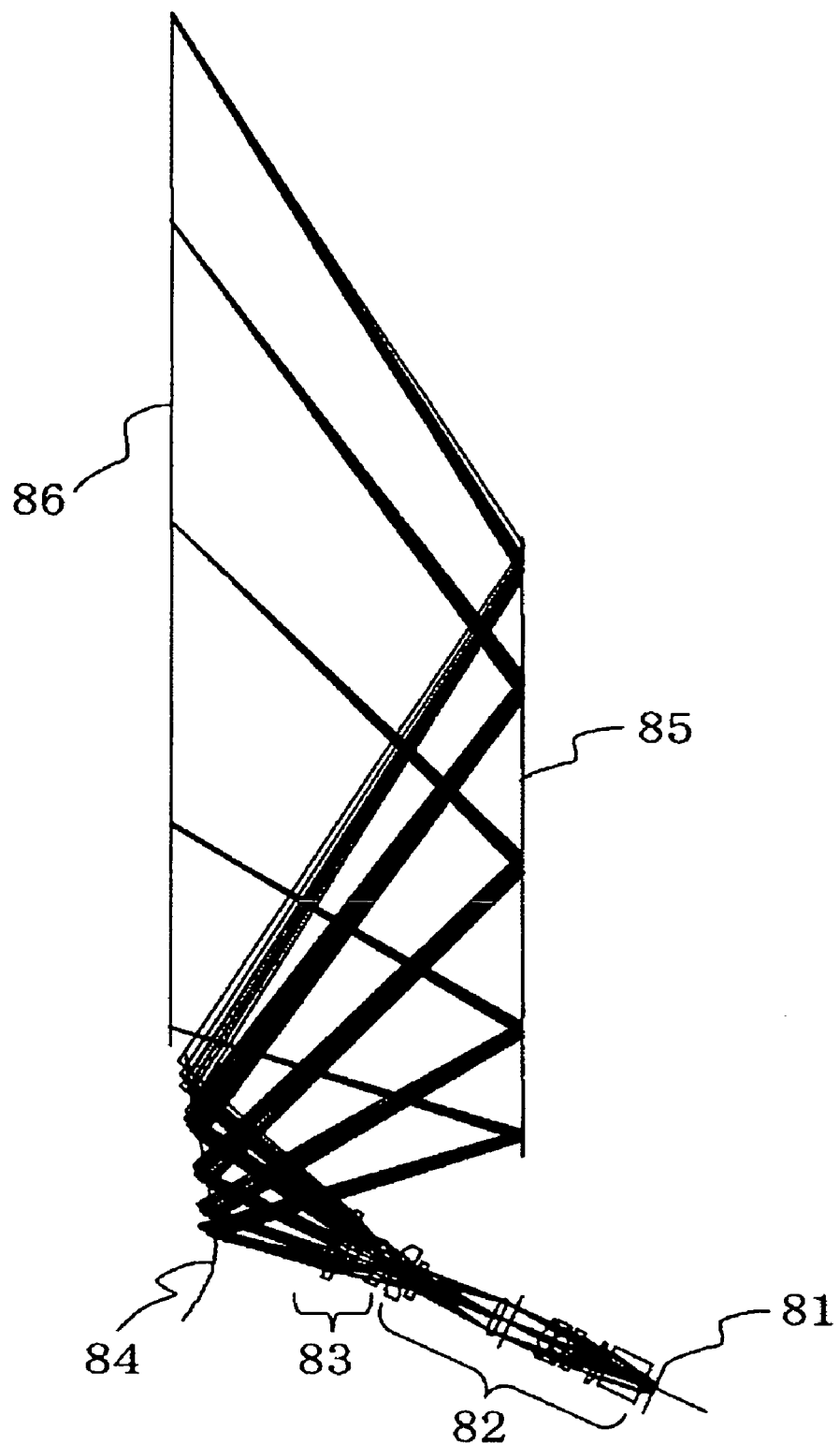
FIG. 14 is a sectional view showing a constitution and an optical path in Embodiment 4 according to the present invention.

FIG. 14 shows a ray diagram of a fourth numerical value example of the present invention. Light emitted from an image display element 81 shown on a lower side of FIG. 14 first passes, in order, through a front group 82 of a first optical system including transmission type lenses having rotationally symmetrical surface shapes, and a rear group 83 of the first optical system including transmission type lenses having free shaped surfaces. Thereafter, the light is reflected by a reflection surface 84 having a free shaped surface of a second optical system, and reflected by a flat rear mirror 85 before entering a screen 86.

Here, the front group 82 of the first optical system includes refraction surfaces which are all rotationally symmetrical, four of the respective refraction surfaces are rotationally symmetrical non-spherical surfaces, and the other surfaces are spherical. The axially symmetrical non-spherical surface used herein is represented by Expression 1 described above by use of a local cylindrical coordinate system for each plane.

The free shaped surfaces constituting the rear group 83 of the first optical system are represented by Expression 2 including the polynomial expression of X, Y as described above by use of a local orthogonal coordinate system (x, y, z) in which a surface vertex of each surface is an origin.

Table 13 shows lens data of the present numerical value example. Surface numbers are shown in order from an object surface S0, S1 to S24, and an image surface S25. In Table 13, Rd denotes a curvature radius of each surface, indicates a positive value in a case where there is a center of the curvature on the left side of the plane in FIG. 14, and indicates a negative value in a reverse case.

In Table 13, TH denotes a distance between surfaces, and indicates a distance between a vertex of a lens surface and that of the next lens surface. As to the associated lens surface, the distance between the surfaces indicates the positive value in a case where the next lens surface is on the left side in FIG. 14, and indicates the negative value in a case where the surface is on the right side.

In Table 13, S5, S6, S17, and S18 denote rotationally symmetrical non-spherical surfaces, and * are attached to the surface numbers in Table 13 in such a manner that they are easily seen. The coefficients of these four non-spherical surfaces are shown in Table 14. In Table 13, S19 to S22 are refraction surfaces having free shaped surfaces constituting the rear group of the first optical system, and S23 provided with # attached to the surface number denotes the reflection surface having the free shaped surface in the second optical system. The values of the coefficients indicating these five free shaped surfaces are shown in Table 15.

Table 16 shows magnitudes of an inclination and an eccentricity of each surface in the present example. In Table 16, rules of indications of values of ADE and YDE are as described above. The inclination of each surface in the present example has an amount substantially equal to that of Example 1 described above. Referring to Table 16, the conditions of Expression 3 described above are not satisfied. However, the depth is small, and priority is given to the depth in the example.

TABLE 13

| Surface | Rd | TH | nd | ν d |
|---|---|---|---|---|
| S0 | Infinity | 10.00 | | |
| S1 | Infinity | 31.34 | 1.51827 | 48.0 |
| S2 | Infinity | 4.97 | | |
| S3 | 49.017 | 4.65 | 1.85306 | 17.2 |
| S4 | 201.672 | 18.00 | | |
| S5* | −60.233 | 9.00 | 1.49245 | 42.9 |
| S6* | −55.360 | 0.10 | | |
| S7 | 56.669 | 9.32 | 1.49811 | 60.9 |
| S8 | −27.651 | 2.50 | 1.76014 | 20.0 |
| S9 | 46.949 | 0.10 | | |
| S10 | 47.407 | 9.00 | 1.49811 | 60.9 |
| S11 | −46.719 | 25.90 | | |
| S12 | Infinity | 9.10 | | |
| S13 | −9457.081 | 6.00 | 1.85306 | 17.2 |
| S14 | −64.870 | 65.00 | | |
| S15 | −42.429 | 4.19 | 1.74702 | 33.2 |
| S16 | 137.716 | 9.00 | | |
| S17* | −34.874 | 10.00 | 1.49245 | 42.9 |
| S18* | −63.364 | 2.50 | | |
| S19 # | Infinity | 8.00 | 1.49245 | 42.9 |
| S20 # | Infinity | 19.55 | | |
| S21 # | Infinity | 8.00 | 1.49245 | 42.9 |
| S22 # | Infinity | 121.95 | | |
| S23 # | Infinity | −350.00 | REFL | |
| S24 | Infinity | 392.00 | REFL | |
| S25 | Infinity | — | | |

TABLE 14

| Surface | | | Non-spherical coefficient | | | | | |
|---|---|---|---|---|---|---|---|---|
| S5 | K | −7.49933947 | C | 8.20794E−12 | F | 1.67212E−19 | J | 2.75191E−26 |
| | A | −4.2871E−06 | D | −3.3905E−14 | G | 1.22978E−22 | | |
| | B | 1.47929E−08 | E | 5.30418E−18 | H | −9.2584E−24 | | |
| S6 | K | −5.10683146 | C | 2.31215E−12 | F | 1.4876E−19 | J | 1.40237E−26 |
| | A | −4.215E−08 | D | −8.8141E−15 | G | −2.1285E−21 | | |
| | B | 9.97857E−09 | E | 2.96852E−17 | H | 3.39217E−25 | | |
| S17 | K | 2.729972673 | C | −6.3329E−11 | F | −5.5239E−19 | J | 2.95633E−25 |
| | A | −6.7402E−06 | D | 3.24143E−13 | G | −2.1415E−20 | | |
| | B | −1.1095E−08 | E | 1.38117E−15 | H | −4.6503E−23 | | |
| S18 | K | 5.628556104 | C | 2.5008E−11 | F | −6.694E−20 | J | 4.08388E−28 |
| | A | −1.8686E−06 | D | 1.72887E−14 | G | −5.6024E−23 | | |
| | B | −1.1602E−08 | E | −2.9081E−17 | H | 5.15556E−26 | | |

TABLE 15

| Surface | | | | Free shaped surface coefficient | | | | |
|---|---|---|---|---|---|---|---|---|
| S19 | | | C17 | 3.06092E−07 | C34 | −1.504E−09 | C51 | 1.89916E−12 |
| | K | 0 | C19 | 2.31689E−06 | C36 | 9.24213E−10 | C53 | −2.6408E−12 |
| | C4 | −0.00523704 | C21 | 3.17855E−07 | C37 | 2.73895E−12 | C55 | −2.2305E−12 |
| | C6 | 0.022327058 | C22 | −2.18E−09 | C39 | −5.7332E−11 | C56 | −2.3991E−15 |
| | C8 | −0.00076156 | C24 | −1.35E−08 | C41 | −6.5197E−11 | C58 | 2.74339E−14 |
| | C10 | −0.00059005 | C26 | −4.4124E−09 | C43 | −1.4355E−10 | C60 | 9.09554E−14 |
| | C11 | 4.88728E−06 | C28 | 2.72086E−08 | C45 | −2.1121E−11 | C62 | 2.42098E−14 |
| | C13 | 1.92499E−05 | C30 | −4.0242E−10 | C47 | 4.94771E−14 | C64 | 1.85581E−13 |
| | C15 | −1.9167E−05 | C32 | −2.6688E−09 | C49 | 5.78829E−13 | C66 | −1.2907E−13 |
| S20 | | | C17 | 4.41515E−08 | C34 | −2.1067E−09 | C51 | 1.36481E−13 |
| | K | 0 | C19 | 2.59357E−06 | C36 | −1.3645E−09 | C53 | −1.7814E−12 |
| | C4 | −0.00380713 | C21 | 1.34672E−06 | C37 | 2.55427E−12 | C55 | 1.48598E−12 |
| | C6 | 0.034310744 | C22 | −6.3335E−10 | C39 | −3.0724E−11 | C56 | −1.1411E−15 |
| | C8 | −0.00082075 | C24 | −3.2842E−08 | C41 | 9.74292E−11 | C58 | 1.71485E−14 |
| | C10 | −0.00096306 | C26 | −9.4354E−08 | C43 | 5.80355E−11 | C60 | 1.60064E−14 |
| | C11 | 1.46478E−06 | C28 | 5.63114E−08 | C45 | −1.3903E−10 | C62 | −1.6566E−13 |
| | C13 | 2.57064E−05 | C30 | −1.5828E−10 | C47 | 7.97383E−14 | C64 | 1.4173E−13 |
| | C15 | −3.3719E−05 | C32 | −9.3186E−10 | C49 | −2.2316E−13 | C66 | 5.32957E−14 |
| S21 | | | C17 | −1.4847E−07 | C34 | −1.578E−10 | C51 | −3.1391E−14 |
| | K | 0 | C19 | −4.1463E−08 | C36 | −3.154E−10 | C53 | 4.92021E−14 |
| | C4 | 0.01628158 | C21 | 3.75928E−07 | C37 | 1.44753E−13 | C55 | −1.2229E−14 |
| | C6 | 0.024536292 | C22 | 8.73333E−10 | C39 | 1.02001E−12 | C56 | −1.1929E−16 |
| | C8 | 0.000287791 | C24 | −1.3318E−09 | C41 | 4.04083E−12 | C58 | −1.9881E−16 |
| | C10 | −5.6467E−05 | C26 | −5.0191E−09 | C43 | 2.15125E−12 | C60 | −1.1661E−16 |
| | C11 | −4.4889E−06 | C28 | −1.338E−09 | C45 | 1.05501E−13 | C62 | −3.9789E−15 |
| | C13 | −7.4216E−06 | C30 | 2.11331E−11 | C47 | −1.2171E−15 | C64 | 1.92077E−15 |
| | C15 | −9.5063E−06 | C32 | 3.73498E−11 | C49 | 1.57629E−14 | C66 | −5.4374E−15 |
| S22 | | | C17 | −1.7539E−07 | C34 | −2.5651E−10 | C51 | −3.1411E−14 |
| | K | 0 | C19 | −1.5271E−07 | C36 | −6.0608E−10 | C53 | 2.14522E−13 |
| | C4 | 0.016419443 | C21 | 5.09788E−07 | C37 | 1.26957E−13 | C55 | 1.76045E−13 |
| | C6 | 0.021115451 | C22 | 7.02901E−10 | C39 | 1.00917E−12 | C56 | −9.5762E−17 |
| | C8 | 0.000323178 | C24 | −1.3689E−10 | C41 | 3.91234E−12 | C58 | −2.6471E−16 |
| | C10 | −4.5525E−05 | C26 | −4.0137E−09 | C43 | −1.1163E−12 | C60 | −2.2728E−16 |
| | C11 | −4.138E−06 | C28 | 1.70813E−10 | C45 | −4.4694E−12 | C62 | −3.086E−15 |
| | C13 | −9.223E−06 | C30 | 2.82551E−11 | C47 | −7.7346E−16 | C64 | 5.99803E−15 |
| | C15 | −9.9105E−06 | C32 | 1.42902E−10 | C49 | −1.2051E−14 | C66 | −1.1247E−15 |
| S23 | | | C17 | −2.5231E−09 | C34 | 7.66238E−14 | C51 | −2.3328E−17 |
| | K | 0 | C19 | 2.58369E−09 | C36 | 3.37658E−15 | C53 | 1.85177E−17 |
| | C4 | 0.002289792 | C21 | 1.24861E−09 | C37 | −1.5632E−16 | C55 | −4.0416E−18 |
| | C6 | 0.000330451 | C22 | 4.81491E−12 | C39 | 2.15761E−15 | C56 | 1.15938E−21 |
| | C8 | 3.09058E−05 | C24 | −3.7371E−11 | C41 | −3.7026E−15 | C58 | −3.3248E−20 |
| | C10 | 1.02245E−05 | C26 | 1.56104E−11 | C43 | 1.35291E−15 | C60 | 7.75597E−20 |
| | C11 | −9.5057E−08 | C28 | 7.8498E−12 | C45 | −3.329E−16 | C62 | −8.1537E−20 |
| | C13 | 3.1048E−07 | C30 | 1.56487E−13 | C47 | −4.2776E−18 | C64 | 8.41917E−20 |
| | C15 | 1.27367E−07 | C32 | −4.1734E−13 | C49 | 1.73654E−17 | C66 | −2.3609E−20 |

TABLE 16

| Surface | ADE (°) | YDE(mm) |
|---|---|---|
| S0 | −2.000 | 0.0 |
| S15 | 0.0 | 0.230 |
| S17 | 0.0 | −0.230 |
| S23 | 35.000 | 0.0 |
| S24 | −45.000 | 0.0 |
| S25 | 45.000 | 0.0 |

On the other hand, in the present example, as shown in Table 16, the surface S15 is eccentric by −0.23 mm, and, conversely, the surface S17 is eccentric by 0.23. In a case where a certain surface is set to be eccentric, the optical axis of the subsequent surface moves as much as the eccentricity. Therefore, the eccentricities of S15 and S17 mean that one lens including the surfaces S15 and S16 is eccentric by −0.193 mm from the according to. This eccentricity is small, and does not have such an adverse influence as to enlarge the size of the lens. This eccentricity realizes minute adjustment of an asymmetrical chromatic aberration.

Moreover, since a value of a difference |L1−L2| between optical path lengths, represented by Expression 1, is 0.64 time the height of the picture plane of the screen, and θs indicates 45 degrees, the conditions of Expression 1 are satisfied.

It is seen from Tables 13 and 15 that in the present example, a curvature c and a conic coefficient k are zero. The trapezoidal distortion due to the oblique incidence is excessively largely generated in an oblique incidence direction, and the distortion is small in a direction vertical to the oblique incidence direction. Therefore, largely different functions are required for the oblique incidence direction and the vertical direction, and the figure distortion can be satisfactorily eliminated without utilizing the curvature c or the conic coefficient k that is rotationally symmetrical and that functions every direction.

As to an effective region of the present numerical value example, an image of a region of 16×9 of the object plane is projected into a size of 1452.8×817.2 on the image plane. A figure distortion in this case is shown in FIG. 15. A vertical direction of FIG. 15 corresponds to a vertical direction of FIG. 14, that is, a Y-axis direction. A lateral direction of FIG. 15 corresponds to a direction vertical to a Y-axis in the screen, and a center of a rectangular shape of a figure corresponds to a center of the picture plane. FIG. 15 shows bent states of straight lines which divide the vertical direction of the picture plane into four and divide the lateral direction into eight, and shows a behavior of the figure distortion.

Figure 16:
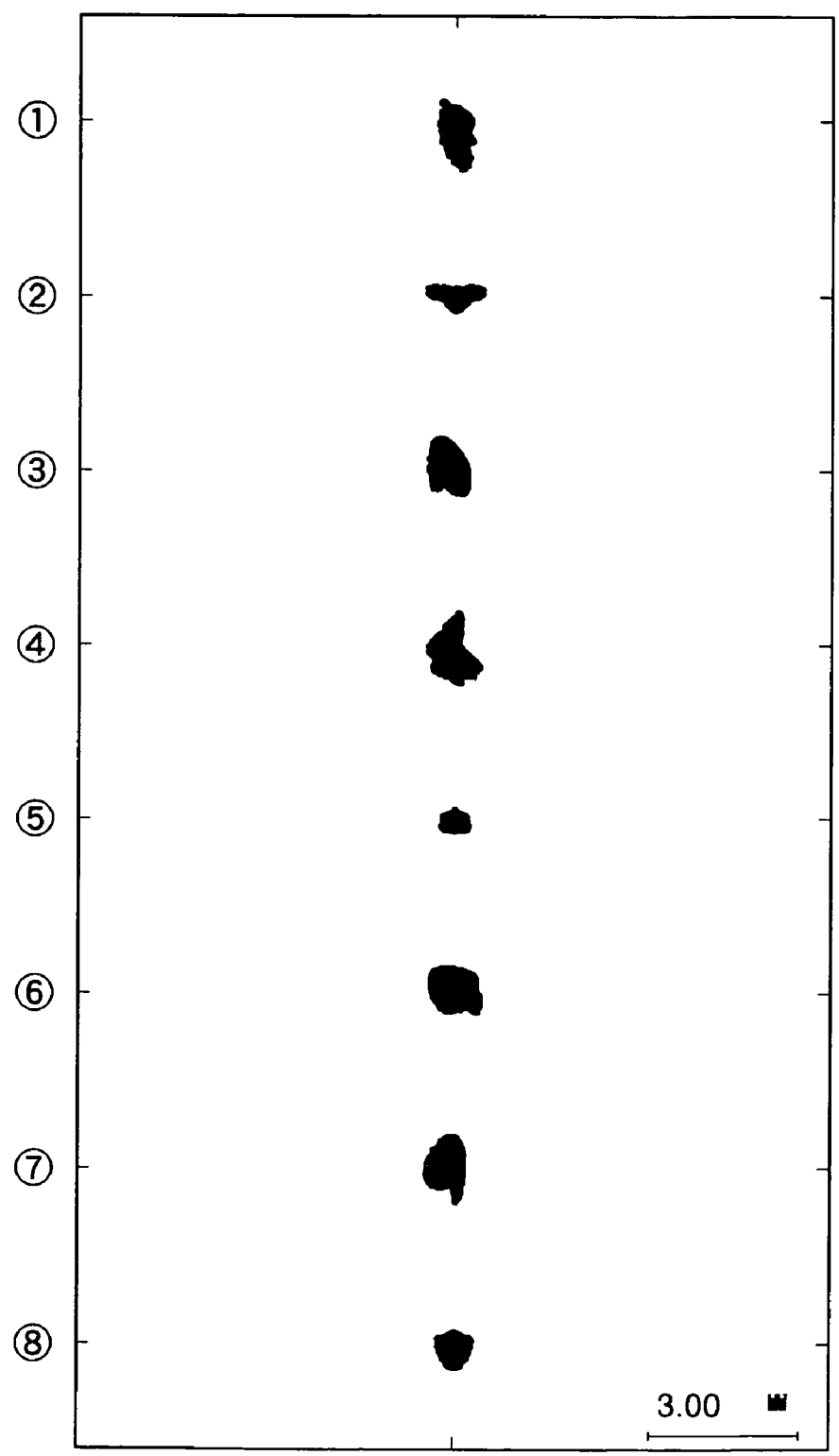
FIG. 16 shows a spot performance of Embodiment 4 according to the present invention.
Figure 17:
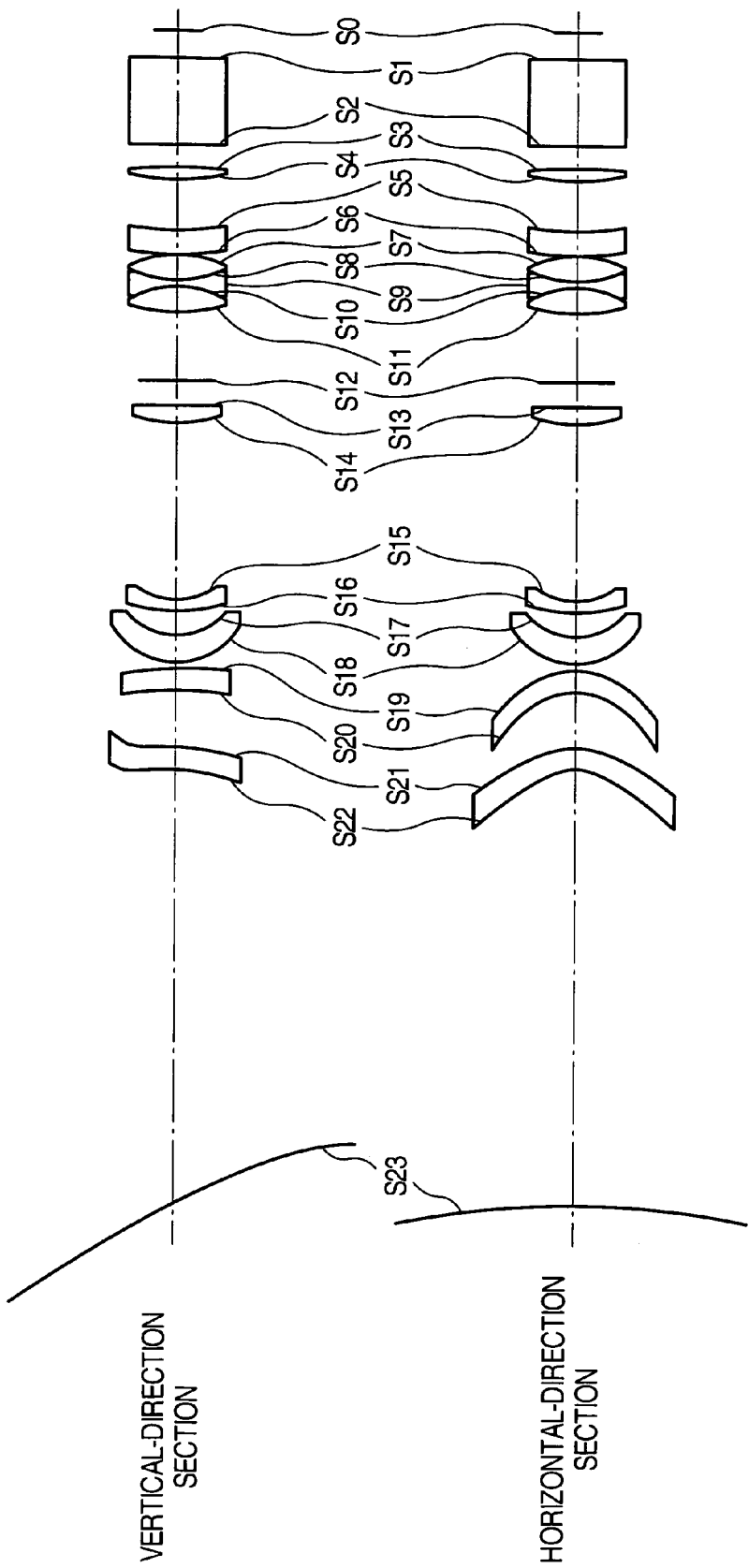
FIG. 17 is a sectional view of an optical unit according to the present invention.

FIG. 16 shows spot diagrams of the present numerical value example. In FIG. 16, there are shown in order from above spot diagrams of luminous fluxes emitted from eight points (8, 4.5), (0, 4.5), (4.8, 2.7), (8, 0), (0, 0), (4.8, −2.7), (8, −4.5), and (0, −4.5) in terms of values of the X, Y coordinate in the display picture plane of the image display element 81. A unit is mm. The lateral direction of each spot diagram corresponds to an X-direction in the screen, and the vertical direction corresponds to a Y-direction in the screen. Satisfactory performances are maintained in both of the directions.

Figure 18:
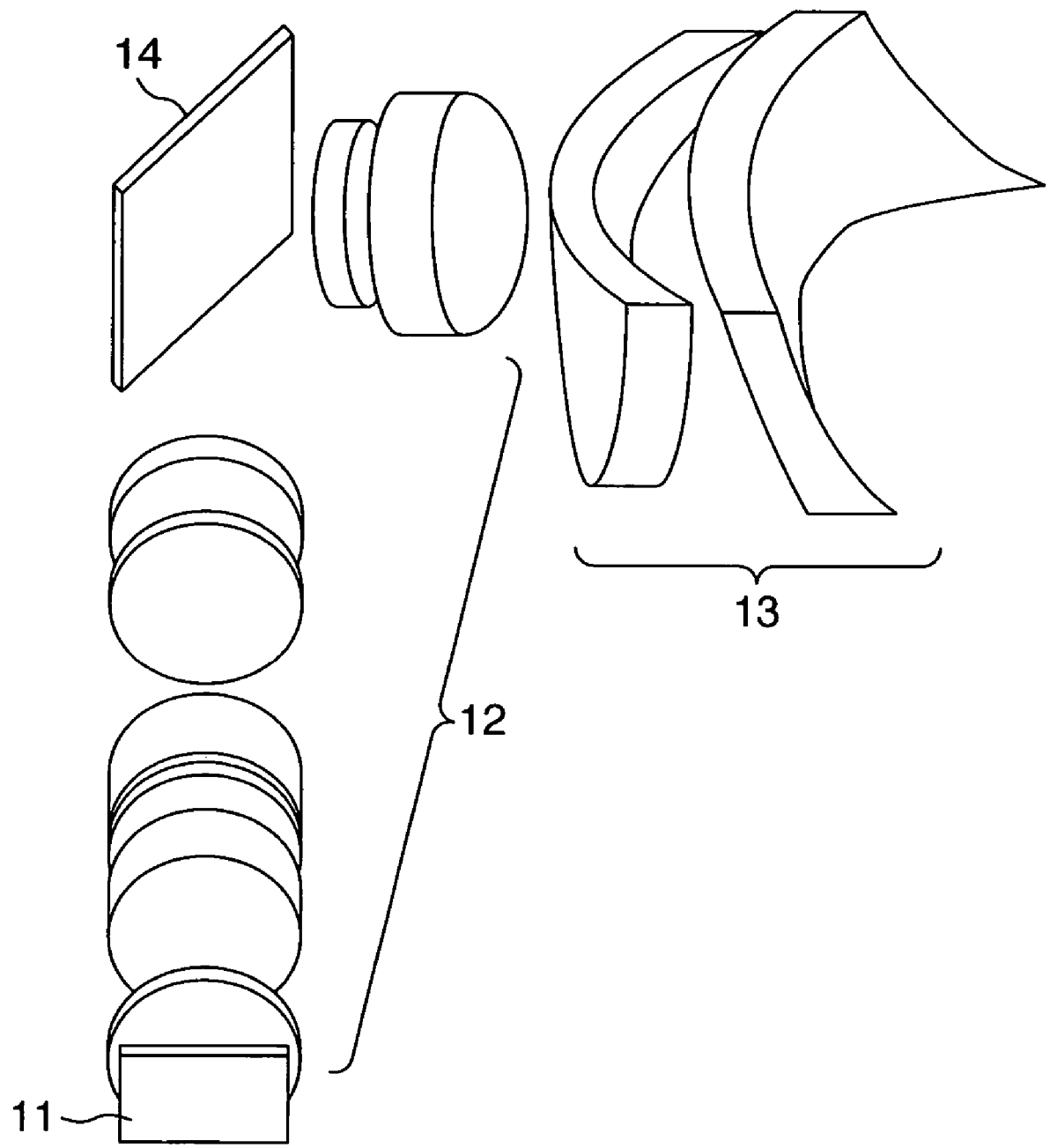
FIG. 18 is a diagram showing an arrangement of lenses of the optical unit according to the present invention.

Furthermore, FIG. 18 shows one example of an arrangement constitution of lenses in a first optical system according to the present invention. As shown in FIG. 18, in the first optical system, an image from an image display element 11 enters a front group 12 including a plurality of lenses having rotationally symmetrical shapes. As described above, the front group 12 includes rotationally symmetrical spherical lenses and non-spherical lenses. A folding mirror 14 is disposed midway in the front group 12, and folds a ray emitted into this folding mirror 14 at right angles. That is, an optical axis of a lens group which passes the ray entering the folding mirror 14 crosses that of a lens group which passes the ray emitted from the folding mirror 14 at right angles. A rear group 13 includes two free-shaped-surface lenses. As shown in FIG. 18, at least one of the lenses directs its concave portion in a light emission direction, and a curvature of a portion (here a lower portion of the non-spherical lens) which passes the ray entering the lower end of the screen may be set to be larger than that of a portion (here an upper portion of the non-spherical lens) which passes the ray entering the upper end of the screen.

As described above, according to the present invention, a rear projection type color image display device can be realized whose depth is very small and which is easily manufactured. In the above-described optical system, the rear mirror is removed, and the image display element to a free-shaped-surface mirror are integrated in one device. Accordingly, a front projection type display device is constituted, and it is possible to realize a compact front projection device in which a distance from the device to the screen is very short.

It should be further understood by those skilled in the art that although the foregoing description has been made on embodiments of the invention, the invention is not limited thereto and various changes and modifications may be made without departing from the spirit of the invention and the scope of the appended claims.

The invention claimed:

1. A projection optical unit for use in a projection type image display device, comprising:
   a first optical system including at least one free-shaped-surface lens having a rotationally asymmetrical free shaped surface for enlarging light from an image display element; and
   a second optical system including at least one free-shaped-surface mirror having a rotationally asymmetrical free shaped reflection surface for reflecting the light from the first optical system,
   wherein a picture plane center ray emitted from a center of a display picture plane of the image display element passes through the first optical system, the second optical system, and a flat reflection mirror to enter the screen obliquely with respect to a normal of the screen in a ease where the light reflected by the free-shaped-surface mirror of the second optical system is reflected by the flat reflection mirror and projected onto the screen, wherein:

the first optical system includes a front group including lenses having rotationally symmetrical shapes, and a rear group including the at least one free-shaped-surface lens; and assuming that a distance of a path of a ray entering an upper end of the screen from the reflection surface of the second optical system is L1, a distance of a path of a ray entering a lower end of the screen from the reflection surface of the second optical system is L2, a distance between the upper end and the lower end of the picture plane of the screen is Dv, and an angle formed by the picture plane center ray and the normal of the screen is θs in a plane including the picture plane center ray and the normal of the screen in a position where the picture plane center ray enters, the following expression is satisfied:

$|L1-L2|<1.2*\sin\theta s*Dv.$

2. The projection type image display device according to claim 1, wherein the normal of the display plane center of the image display element substantially disposed on the optical axis of the first optical system is inclined with respect to the optical axis of the first optical system.

3. The projection type image display device according to claim 1, wherein an optical path length ranging from a final surface of the front group to the reflection surface of the second optical system is five or more times a focal distance of the front group in the path of the picture plane center ray traveling to the screen.

4. The projection type image display device according to claim 1, wherein a shape of the reflection surface of the second optical system in a first position whose optical distance to the screen is closest has a convex shape in a reflection direction, a shape of the reflection surface of the system in a second position whose optical distance to the screen is farthest has a convex shape in the reflection direction, and a curvature of the convex shape of the second position is smaller than that of the convex shape of the second position.

5. The projection type image display device according to claim 1, wherein a shape of the reflection surface of the second optical system in a first position whose optical distance to the screen is closest has a convex shape in a reflection direction, and a shape of the reflection surface of the system in a second position whose optical distance to the screen is farthest has a concave shape in the reflection direction.

6. The projection type image display device according to claim 1, wherein assuming that an angle formed by the picture plane center ray and the normal of the screen is θs, and an angle formed by the normal of the free-shaped-surface mirror and the picture plane center ray is θm in a position of the free-shaped-surface mirror where the picture plane center ray enters, the following expression is satisfied:

$\theta s+2*\theta m2 <95.$

7. The projection type image display device according to claim 1, wherein a mirror is disposed midway in the front group, and an optical axis of a lens which passes light entering the mirror crosses that of a lens which passes light emitted from the mirror substantially at right angles.

8. The projection type image display device according to claim 1, wherein the image display element is disposed in such a manner that the center of the display picture plane of the image display element is positioned on the optical axis of the first optical system in the projection optical unit according to claim 8.

9. A projection type image display device comprising:

a first optical system including at least one free-shaped-surface lens having a rotationally asymmetrical free shaped surface for enlarging light from an image display element; and a second optical system including at least one free-shaped-surface mirror having a rotationally asymmetrical free shaped reflection surface for reflecting light from the first optical system, wherein a picture plane center ray emitted from a center of a display picture plane of the image display element passes through the first optical system, the second optical system, and a flat reflection mirror to enter the screen obliquely with respect to a normal of the screen in a case where the light reflected by the free-shaped-surface mirror of the second optical system is reflected by the flat reflection mirror and projected onto the screen, and assuming that a distance of a path of a ray entering an upper end of the screen from the reflection surface of the second optical system is L1, a distance of a path of a ray entering a lower end of the screen from the reflection surface of the second optical system is L2, a distance between the upper end and the lower end of the picture plane of the screen is Dv, and an angle formed by the picture plane center ray and the normal of the screen is θs in a plane including the picture plane center ray and the normal of the screen in a position where the picture plane center ray enters, the following expression is satisfied:

$|L1-L2|<1.2*\sin\theta s*Dv.$

* * * * *